United States Patent
Tashiro

(10) Patent No.: US 11,461,602 B2
(45) Date of Patent: Oct. 4, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hideyasu Tashiro, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/493,360

(22) Filed: Oct. 4, 2021

(65) Prior Publication Data

US 2022/0108141 A1    Apr. 7, 2022

(30) Foreign Application Priority Data

Oct. 5, 2020   (JP) .............................. JP2020-168776

(51) Int. Cl.
*G06K 15/02* (2006.01)
*G06K 15/10* (2006.01)

(52) U.S. Cl.
CPC ....... *G06K 15/1881* (2013.01); *G06K 15/102* (2013.01)

(58) Field of Classification Search
CPC .................. G06K 15/1881; G06K 15/102
See application file for complete search history.

(56) References Cited

U.S. PATENT DOCUMENTS

| 9,208,417 | B2* | 12/2015 | Kikuta ............... G06K 15/1881 |
| 2007/0046706 | A1 | 3/2007 | Kayahara et al. |
| 2011/0019214 | A1* | 1/2011 | Taya ..................... G03G 15/01 358/1.9 |

FOREIGN PATENT DOCUMENTS

JP    2007-083407 A    4/2007

* cited by examiner

*Primary Examiner* — Quang N Vo

(74) *Attorney, Agent, or Firm* — Venable LLP

(57) ABSTRACT

An image processing apparatus that converts input image data into halftone image data that a plurality of arranged nozzles ejecting ink can print and includes one or more hardware processors and one or more memories storing one or more programs configured to be executed by the one or more hardware processors, the one or more programs including instructions for correcting a pixel value of each pixel in the input image data in accordance with a characteristic of the nozzle and generating first halftone image data by performing halftone processing for a second frequency component whose frequency is lower than that of a first frequency component of frequency components corresponding to the corrected input image data. Here, the first halftone image data is data that is generated to be printed with first dots whose dot size causes adjacent dots to overlap.

15 Claims, 33 Drawing Sheets

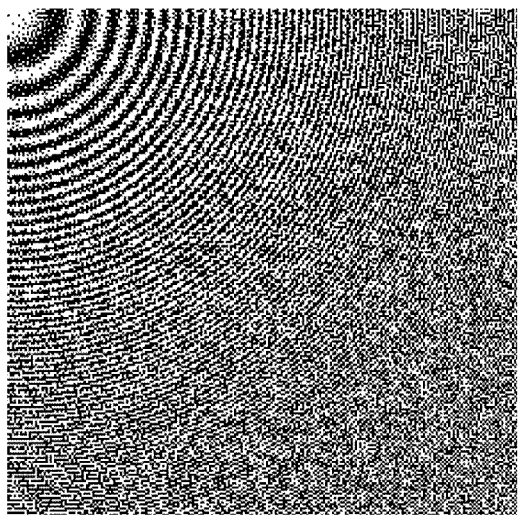 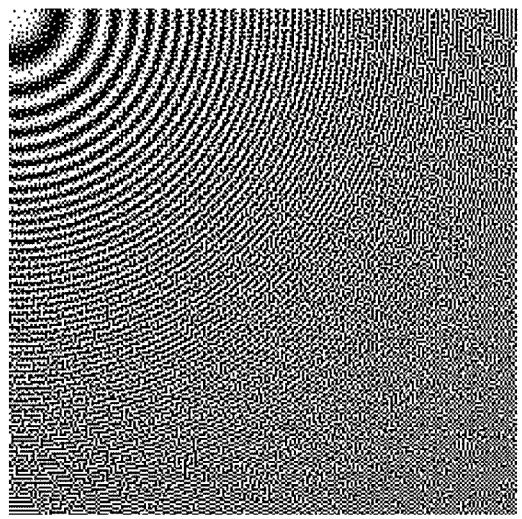
FIG.2A  FIG.2B

| k | INPUT PIXEL VALUE $I_0$ | | | | |
|---|---|---|---|---|---|
| | 0 | 1 | 2 | ... | 255 |
| PIXEL POSITION IN y-DIRECTION (pixel) 1 | 0.98 | 1.00 | 1.01 | ... | 1.05 |
| 2 | 1.12 | 1.10 | 1.09 | ... | 1.01 |
| 3 | 1.01 | 0.99 | 0.99 | ... | 0.95 |
| ⋮ | ⋮ | ⋮ | ⋮ | ⋱ | ⋮ |
| Y | 0.99 | 1.01 | 1.02 | ... | 1.07 |

FIG.7

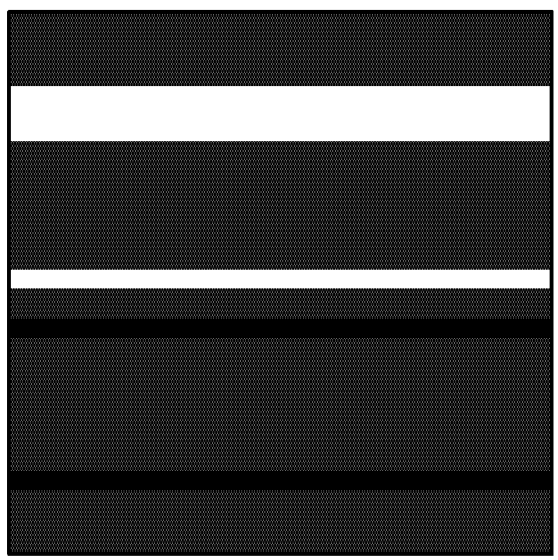 
FIG.18A  FIG.18B

IMAGE PROCESSING APPARATUS, IMAGE PROCESSING METHOD, AND STORAGE MEDIUM

BACKGROUND OF THE INVENTION

Field of the Invention

This application claims the benefit of Japanese Patent Application No. 2020-168776, filed Oct. 5, 2020 which is hereby incorporated by reference herein in its entirety.

The present disclosure relates to an image processing technique to generate a halftone image that a printing apparatus printing an image can print.

Description of the Related Art

Conventionally, in a printing apparatus that prints an image on a printing medium by the ink jet printing method, and the like, a technique is known that converts image data into halftone image data that the printing apparatus can print by performing halftone processing for the image data. Further, a correction processing technique is known that reduces density unevenness due to a deviation in the ink landing position, and the like, resulting from a variation in the conveyance amount of a printing medium or in the ejection direction of ink ejected from a printing unit.

Japanese Patent Laid-Open No. 2007-83704 has disclosed a technique to reduce density unevenness due to the nozzle characteristics in an image that is printed on a printing medium by performing halftone processing after performing correction processing of density unevenness for image data based on information on the printing state by each nozzle.

In a case when the dot size based on the halftone image obtained by performing halftone processing after the above-described correction processing is larger than the nozzle interval, it may happen that the dots adjacent to each other are coupled to each other, and, therefore, it is not possible to print high-frequency shading. As a result of that, the halftone processing and the high-frequency component in an image for which density unevenness due to the nozzle characteristics has been corrected interfere with each other, and, therefore, there is such a problem that moire that does not exist in an original image occurs.

Consequently, in view of the above-described problem, an object of the technique of the present disclosure is to suppress the occurrence of moire in a halftone image while correcting density unevenness due to the nozzle characteristics even in a case when the dot size that is printed on a printing medium is larger than the nozzle interval.

SUMMARY OF THE INVENTION

The image processing apparatus according to the present disclosure is an image processing apparatus converting input image data into halftone image data that a plurality of arranged nozzles ejecting ink can print and includes one or more hardware processor, and one or more memories storing one or more programs configured to be executed by the one or more hardware processors, the one or more programs including instructions for correcting a pixel value of each pixel in the input image data in accordance with a characteristic of the nozzle, and generating first halftone image data by performing halftone processing for a second frequency component whose frequency is lower than that of a first frequency component of frequency components corresponding to the corrected input image data, and the first halftone image data is data that is generated to be printed with first dots whose dot size causes adjacent dots to overlap.

Further features of the present disclosure will become apparent from the following description of exemplary embodiments with reference to the attached drawings.

BRIEF DESCRIPTION OF THE DRAWINGS

FIG. 2A is a diagram showing a halftone image obtained by printing a CZP chart with large dots;

FIG. 2B is a diagram showing a halftone image obtained by printing a CZP chart with small dots;

FIG. 7 is a diagram showing an example of a density correction table;

FIG. 18A is an image diagram of image data configured by pixel values distributed to large dots;

FIG. 18B is an image diagram of image data configured by pixel values distributed to small dots;

DESCRIPTION OF THE EMBODIMENTS

Hereafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, for the pixel value of image data for which density unevenness (in the following, also referred to as "stripe unevenness") due to the nozzle characteristic has been corrected, filter processing using a low-pass filter (in the following, also referred to as "LPF") in accordance with the frequency characteristic of a dot pattern is performed. Due to this, the occurrence of moire in a halftone image that is printed on a printing medium is suppressed.

A print image printing apparatus 311 (see FIG. 3) is an image printing apparatus that adopts the ink jet method. The direction parallel to the direction of the nozzle array of the print image printing apparatus 311 is taken to be the y-direction. Further, the direction parallel to the direction in which a printing unit of the print image printing apparatus 311 relatively scans a printing medium at the time of printing an image on the printing medium is taken to be the x-direction. This x-direction is the direction perpendicular to the y-direction described previously. The print image printing apparatus 311 has a printing unit including a nozzle array whose length corresponds to the width of the printing medium in the y-direction and adopts the full-line method in which an image is printed on the printing medium by causing the printing unit to relatively scan the printing medium in the x-direction. In the present embodiment, the print image printing apparatus 311 prints an image on the printing medium with dots whose dot size is uniform and larger than the nozzle interval.

An image processing apparatus 300 (see FIG. 3) performs dither processing as halftone processing to convert input image data into halftone image data that the print image printing apparatus 311 can print on the printing medium.

Figure 1:
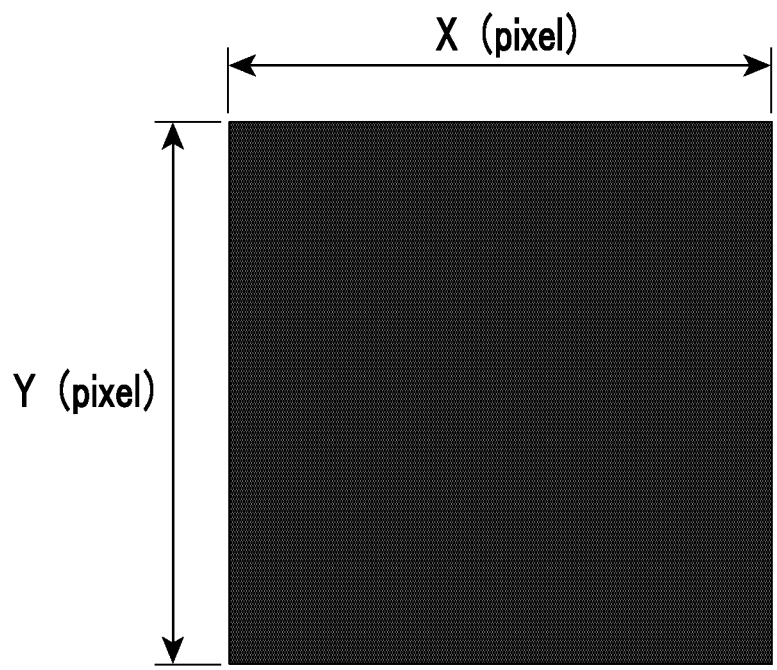
FIG. 1 is an image diagram of input image data.

FIG. 1 is an image diagram of input image data. As shown in FIG. 1, the input image data is solid image data in which the pixel value of each pixel is the same. Each pixel of the solid image data is associated with a pixel value $I_0$. The solid image data is represented by Y (pixel) in the y-direction×X (pixel) in the x-direction. The image processing apparatus 300 generates halftone image data by performing the dither processing for the solid image data of the pixel value $I_0$ shown in FIG. 1.

Here, a relationship between the dot size that is printed on the printing medium by the print image printing apparatus 311 and the frequency characteristic of the halftone image is explained. FIG. 2A and FIG. 2B each show a halftone image in which a CZP chart is represented by using large dots and that in which the CZP chart is represented by using small dots. Here, the CZP chart is a chart that visualizes the frequency characteristic in the two-dimensional space and which is obtained by overlapping sinusoidal waves concentrically so that the spatial frequency increases from the top left toward the bottom right.

The halftone images shown in FIG. 2A and FIG. 2B are dot-pattern images obtained by simulating a binary halftone image indicating ON/OFF of printing with an ink dot including the dot sizes of large dots and small dots. Then, it can be seen that moire has occurred in the large-dot halftone image shown in FIG. 2A because dots adjacent to each other are coupled in the high-frequency component of the dot pattern. On the other hand, it can be seen that interference between dots adjacent to each other is not conspicuous in the high-frequency component in the small-dot halftone image shown in FIG. 2B.

<Hardware Configuration of Image Processing Apparatus>

Figure 3:
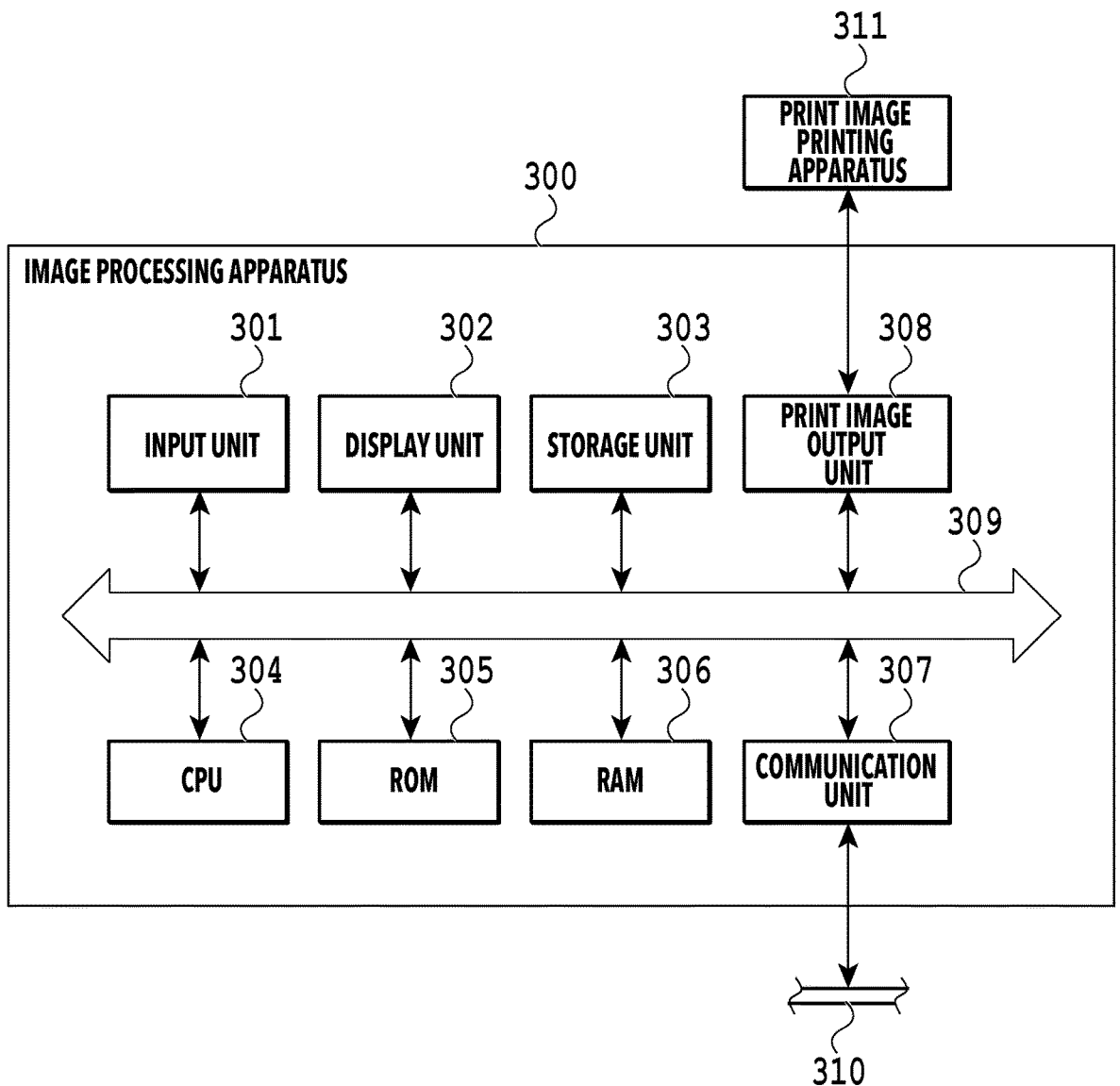
FIG. 3 is a block diagram showing a hardware configuration of an image processing apparatus.

FIG. 3 is a block diagram showing the hardware configuration of the image processing apparatus 300 in the present embodiment. In the following, the hardware configuration of the image processing apparatus 300 in the present embodiment is explained by using FIG. 3. The image processing apparatus 300 has an input unit 301, a display unit 302, a storage unit 303, a CPU 304, a ROM 305, a RAM 306, a communication unit 307, a print image output unit 308, and a system bus 309. The CPU 304 controls each piece of hardware, to be described later, via the system bus 309, by performing the OS or various programs stored in the ROM 305 or the storage unit 303 by using the RAM 306 as a work memory.

The input unit 301 is a serial bus interface, such as USB, and to which, an input device, such as a keyboard or a mouse, and an image input device, such as a memory card reader, a digital camera, or a scanner, are connected. The CPU 304 inputs user instructions, image data, or the like, via the input unit 301 and displays a graphic user interface (GUI), an image, processing progress, results, or the like, on the display unit 302.

The storage unit 303 is a storage medium, such as a hard disk drive (HDD) or a solid state drive (SSD), in which a variety of kinds of data, such as various programs, are stored. In the data that is stored in the storage unit 303, programs for implementing processing, to be described later, are included.

The communication unit 307 is a network interface for connecting a network 310 (wired network, such as Ethernet (registered trademark), or wireless network, such as Bluetooth (registered trademark), Wi-Fi (registered trademark), or P2P) and the image processing apparatus 300. The print image output unit 308 is a serial bus interface, such as USB. To the print image output unit 308, a memory card writer, and the like, are connected, other than the print image printing apparatus 311. The CPU 304 outputs image data, and the like, via the print image output unit 308.

The CPU 304 communicates with a server apparatus, another computer device, or the like, which is connected to the network 310, via the communication unit 307. Further, it is possible for the CPU 304 to perform processing by receiving various programs or data from a server apparatus, another computer device, or the like, connected to the network 310. Furthermore, it is possible for the CPU 304 to provide the data of the processing results to a server apparatus, another computer device, or the like, connected to the network 310. The computer device with which the CPU 304 can communicate via the communication unit 307 also includes the print image printing apparatus 311. Because of this, it is also possible for the CPU 304 to transmit image data to the print image printing apparatus 311 via the communication unit 307.

The information processing apparatus that is made use of as the image processing apparatus 300 is, for example, a computer device, such as a personal computer, a tablet, or a smartphone. The information processing apparatus has the function as the image processing apparatus 300 by being supplied with programs for implementing image processing, to be described later. In a case when a tablet or a smartphone is made use of as the image processing apparatus 300, the display unit 302 may have a touch screen function. In this case, the display unit 302 functions also as the input unit 301 configured to receive user instructions.

<Function Configuration of Image Processing Apparatus>

Figure 4:
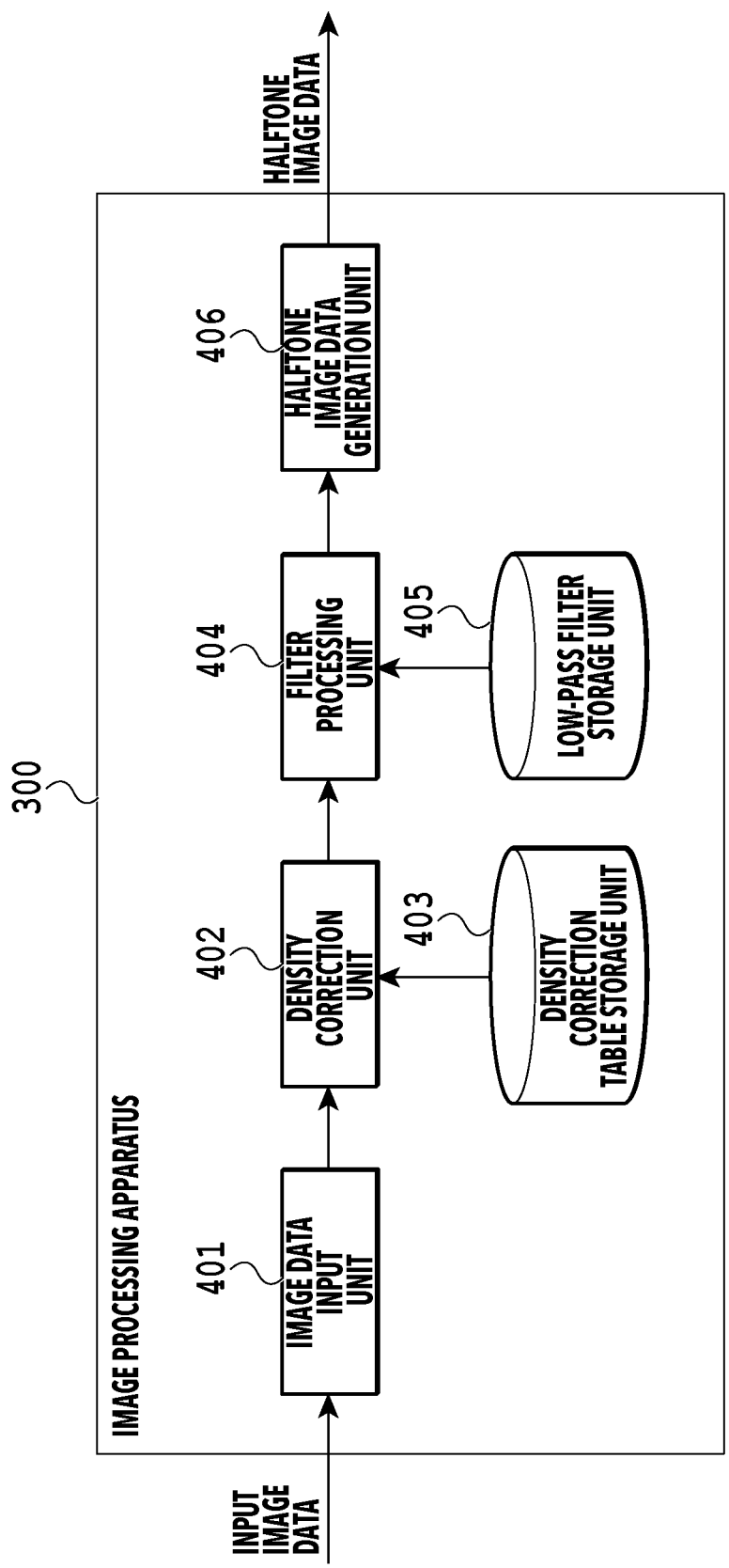
FIG. 4 is a block diagram showing a function configuration of the image processing apparatus.

FIG. 4 is a block diagram showing a detailed function configuration of the image processing apparatus 300 in the present embodiment. The function configuration shown in FIG. 4 is implemented by the CPU 304 of the image processing apparatus 300 executing programs for implementing the function configuration or the function thereof.

An image data input unit 401 inputs input image data designated by a user via the input unit 301 to the image processing apparatus 300. Specifically, the image data input unit 401 outputs the input image data to a density correction unit 402. In the present embodiment, the input image data is monochrome image data corresponding to the color of one of printing materials of the print image printing apparatus 311 and is 8-bit image data in which each pixel has a pixel value of one of 0 to 255.

The density correction unit 402 suppresses stripe unevenness due to the nozzle characteristic by correcting the pixel value $I_0$ (in the following, also referred to as input pixel value $I_0$) of each pixel of the input image data with reference to a density correction table stored in advance in a density correction table storage unit 403. Then, the density correction unit 402 outputs the image data after the connection processing to a filter processing unit 404.

The filter processing unit 404 performs filter processing by using an LPF acquired from a low-pass filter storage unit 405 in accordance with the frequency characteristic of the dot pattern for the pixel value of the image data after the correction processing of stripe unevenness. This LPF is stored in advance in the low-pass filter storage unit 405. Then, the filter processing unit 404 outputs the image data after the filter processing to a halftone image data generation unit 406.

The halftone image data generation unit 406 generates halftone image data by performing the dither processing for the image data after the filter processing. A dither matrix necessary for performing the dither processing is stored in advance in a predetermined storage area. Then, the halftone image data generation unit 406 outputs the generated halftone image data to the print image printing apparatus 311 via the print image output unit 308.

<Processing Performed by Image Processing Apparatus>

Figure 5:
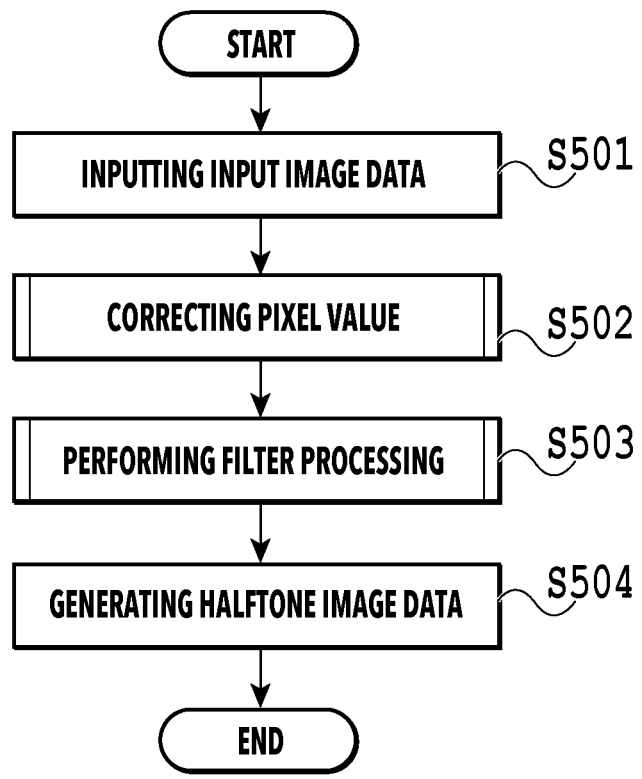
FIG. 5 is a flowchart of processing performed by the image processing apparatus.

FIG. 5 is a flowchart of processing performed by the image processing apparatus 300 in the present embodiment. The flowchart shown in FIG. 5 is implemented by the control program stored in the storage unit 303 or the ROM 305 of the image processing apparatus 300 being read onto the RAM 306 and by the CPU 304 executing the program. Alternatively, it may also be possible to implement part or all of the functions at steps in FIG. 5 by hardware, such as an ASIC or an electronic circuit. Symbol "S" in the explanation of each piece of processing means a step in the flowchart.

At S501, the image data input unit 401 inputs input image data designated by a user to the image processing apparatus 300. Here, as the input image data, the solid image data shown in FIG. 1 is designated. The image data input unit 401 stores the input image data in a storage area, such as the RAM 306.

At S502, the density correction unit 402 corrects the input pixel value $I_0$ with reference to the density correction table stored in advance in the density correction table storage unit 403. Details of the correction processing at this step will be described later by using FIG. 6.

At S503, the filter processing unit 404 performs the filter processing by using an LPF for the pixel value of the image data after the correction processing, which is obtained at S502. Details of the filter processing at this step will be described later by using FIG. 10.

At S504, the halftone image data generation unit 406 generates halftone image data by performing the dither processing using the dither matrix stored in advance in the predetermined storage area for the image data after the filter processing, which is obtained at S503. The halftone image data that is generated here is binary image data in which the pixel value of each pixel takes one of 1 and 0. The halftone image data generation unit 406 stores the generated halftone image data in a predetermined storage area.

<Processing Performed by Density Correction Unit>

Figure 6:
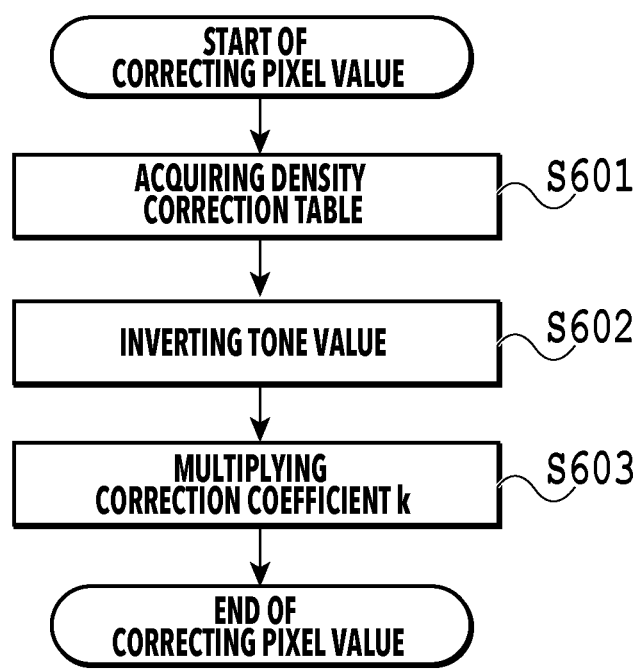
FIG. 6 is a flowchart of processing performed by a density correction unit.

FIG. 6 is a flowchart of processing performed by the density correction unit 402. In the following, details of the processing to correct the input pixel value $I_0$ at S502 are explained by using the flowchart in FIG. 6.

At S601, the density correction unit 402 acquires the density correction table stored in advance in the density correction table storage unit 403. In this density correction table, a correction coefficient k at each pixel position in the y-direction is stored and based on the nozzle characteristic of the print image printing apparatus 311, the input pixel value $I_0$, and the dither matrix used in the dither processing, the correction coefficient k corresponding to each pixel position is determined.

FIG. 7 is a diagram showing an example of the density correction table in the present embodiment. The density correction unit 402 refers to the density correction table and determines the correction coefficient k in accordance with the pixel position in the y-direction of each pixel and the input pixel value $I_0$ for the input image data.

Figure 8:
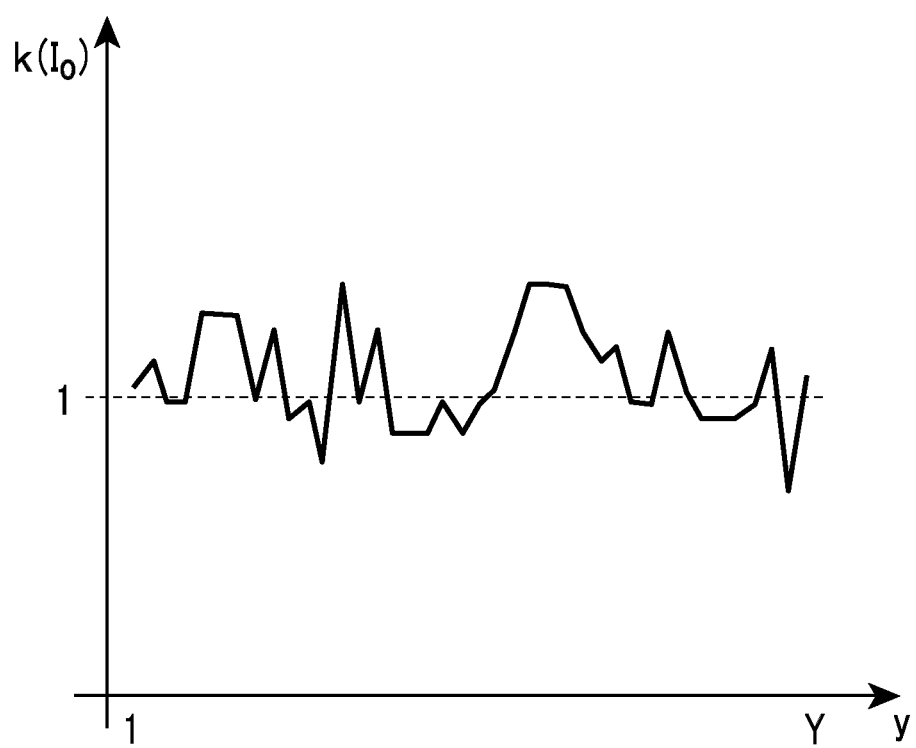
FIG. 8 is a diagram showing an example of a correction coefficient.

FIG. 8 is a diagram showing an example of the correction coefficient k. In FIG. 8, the horizontal axis represents the pixel position in the y-direction of each pixel and the vertical axis represents a correction coefficient k ($I_0$) in accordance with the pixel position in the y-direction of each pixel. In the present embodiment, the input image data is the solid image data shown in FIG. 1, and, therefore, the input pixel value $I_0$ is constant. Because of this, for the pixel whose pixel position in the y-direction of the input image data is the same, irrespective of the pixel position in the x-direction, the correction coefficient k ($I_0$) shown in FIG. 8 is selected.

At S602, the density correction unit 402 inverts the tone value of the input pixel value $I_0$. Due to this, the pixel value in the processing-target 8-bit input image is made linear in density. By this tone value inversion processing, in the pixel area in which the input pixel value $I_0$ is 0, dots are not at all printed and in the pixel area in which the input pixel value $I_0$ is 255, dots are printed in the entire pixel area.

Figure 9:
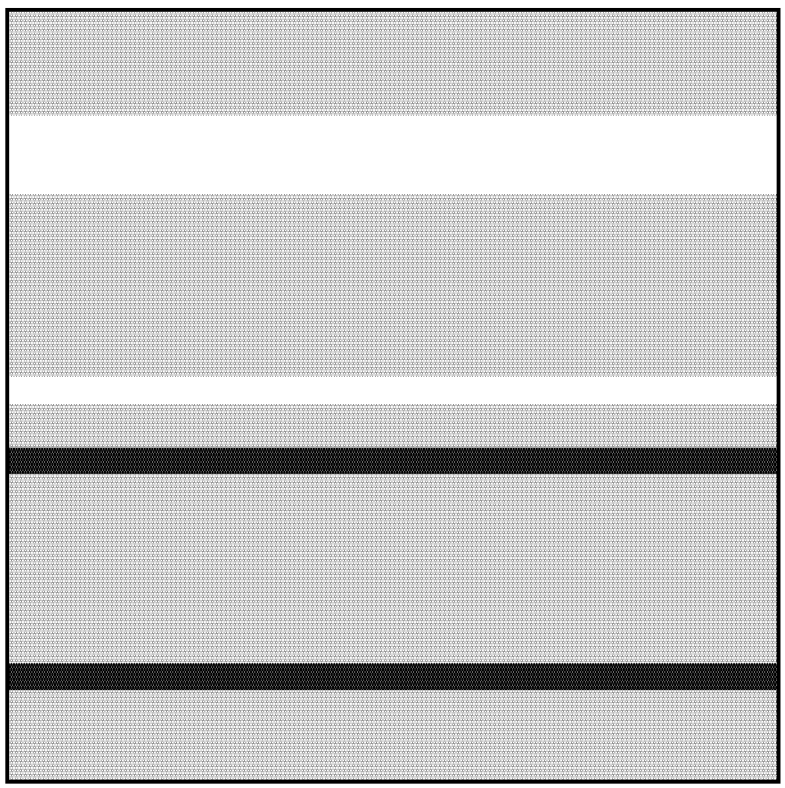
FIG. 9 is an image diagram of image data after correction processing of stripe unevenness.

At S603, the density correction unit 402 obtains a new pixel value for each pixel by multiplying the input pixel value $I_0$ in the image after the tone value inversion by the correction coefficient k corresponding to each pixel, which is determined at S601. Due to this, an image is obtained in which the pixel value is corrected so that stripe unevenness due to the nozzle characteristic is suppressed. FIG. 9 is an image diagram of the image data after the density correction processing. It can be seen that the image data has the shading opposite to that of the stripe unevenness so as to cancel the stripe unevenness due to the nozzle characteristic. The image data after the correction processing is stored in a predetermined storage area.

<Processing Performed by Filter Processing Unit>

Figure 10:
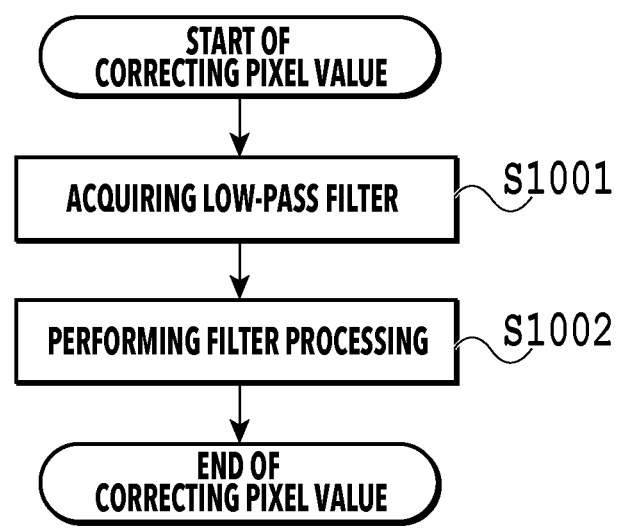
FIG. 10 is a flowchart of processing performed by a filter processing unit.

FIG. 10 is a flowchart of processing performed by the filter processing unit 404. In the following, details of the filter processing using an LPF for the image data after the density correction processing at S503 are explained by using the flowchart in FIG. 10.

At S1001, the filter processing unit 404 acquires from the low-pass filter storage unit 405 the LPF created in advance in accordance with the frequency characteristic of the dot pattern of dots to be ejected which is applied to the image data after the density correction processing. Here, it is assumed that a one-dimensional filter that is one dimensional in the y-direction, specifically, a one-dimensional Gaussian filter with a standard deviation of $\sigma_D$ is used. This one-dimensional Gaussian filter is created in advance by a procedure as follows.

Figure 11A:
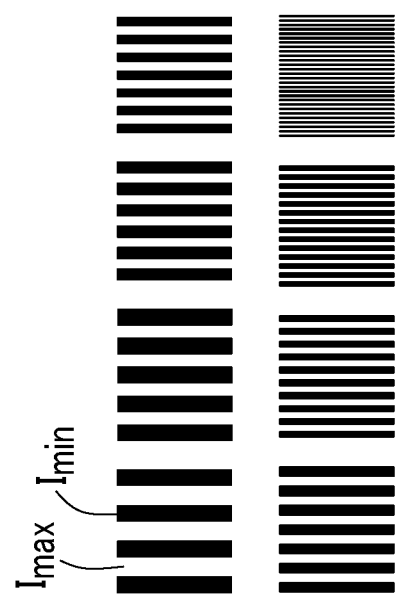
FIG. 11A is an image diagram of a CTF chart.

First, a CTF chart image including rectangular wave patterns at a variety of frequencies as shown in FIG. 11A is output by the print image printing apparatus 311 and a contrast ratio $C_D$ (f) of the rectangular wave pattern at a frequency of f is calculated in accordance with formula (1) below. This frequency f is a frequency at which it is possible to print an image without unexpected coupling of dots in a case when the image is printed with large dots.

[Mathematical formula 1]

$$C_D(f) = (I_{max} - I_{min})/(I_{max} + I_{min}) \quad \text{formula (1)}$$

Figure 11B:
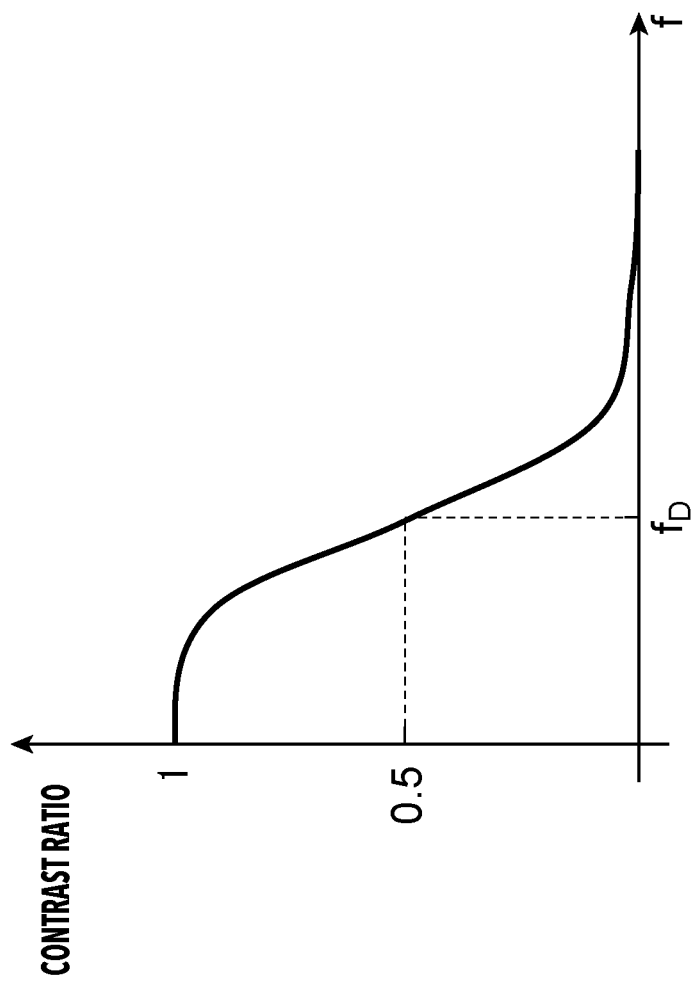
FIG. 11B is a diagram showing a contrast ratio of a frequency of the CTF chart.

In formula (1) described above, $I_{max}$ and $I_{min}$ are luminance at the paper white portion and the black line portion of the rectangular wave pattern at the frequency f. The luminance is determined in advance based on the pixel value in the image data obtained by scanning the image printed on the printing medium In a case of the present embodiment, as shown in FIG. 11B, the contrast ratio $C_D$ (f) of the rectangular wave pattern at a frequency of $f_D$ is 0.5. This indicates, that in a case when input image data in which a frequency component higher than the frequency $f_D$ is included, is input to the image processing apparatus 300, there is a possibility that moire occurs due to a folded component. Consequently, a Gaussian filter with the standard deviation $\sigma_D$ is created in advance as an LPF. The standard deviation $\sigma_D$ is found by formula (2) below.

[Mathematical formula 2]

$$\sigma_D = f_S/f_D \quad \text{formula (2)}$$

In formula (2) described above, $f_S$ is a sampling frequency of the print image printing apparatus 311. In the present embodiment, in the rectangular wave pattern whose $f_D$ is 300 dpi, the contrast ratio $C_D$ ($f_D$) is 0.5. Further, the print image printing apparatus 311 has a print head of 1,200 dpi, and, therefore, $f_S$ is 1,200 dpi. Consequently, the standard deviation $\sigma_D$ of the Gaussian filter is 4 (pixel).

At S1002, the filter processing unit 404 performs the filter processing using the LPF acquired at S1001 for the pixel value of the image data after the correction processing. By this filter processing, the high-frequency component in the image data after the correction processing is removed.

Figure 12:
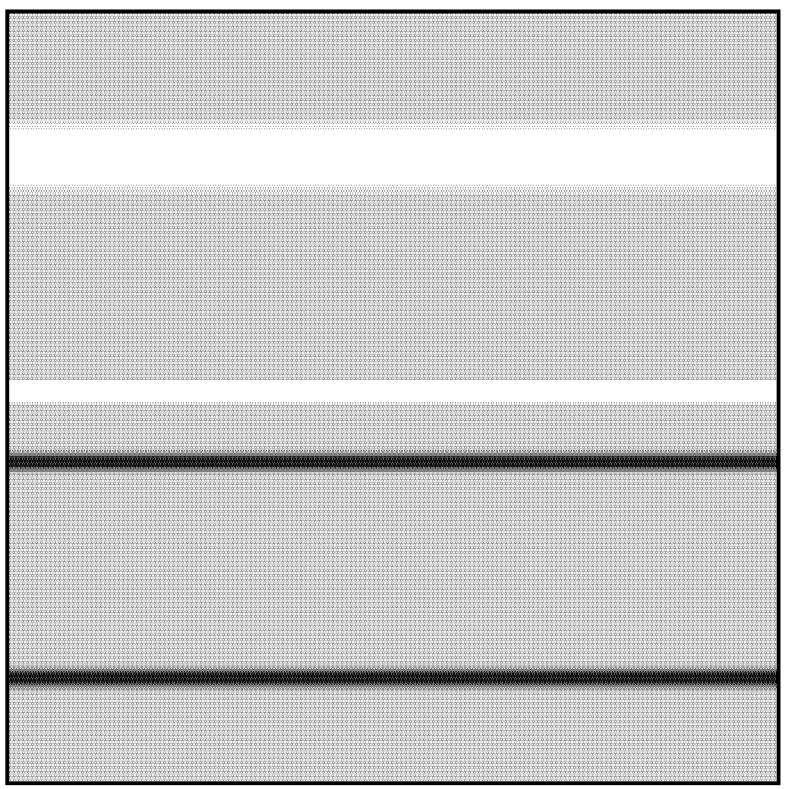
FIG. 12 is an image diagram of image data after filter processing.

FIG. 12 shows the image data after the filter processing using the LPF. It can be seen that an image, in which the change in the pixel value is gradual, is obtained compared to the image after the correction processing shown in FIG. 9 by performing the filter processing using the LPF. The image data after the filter processing from which the high-frequency component has been removed is stored in a predetermined storage area, and then is subjected to the dither processing in the halftone image data generation unit 406, halftone image data is generated.

Figure 13:
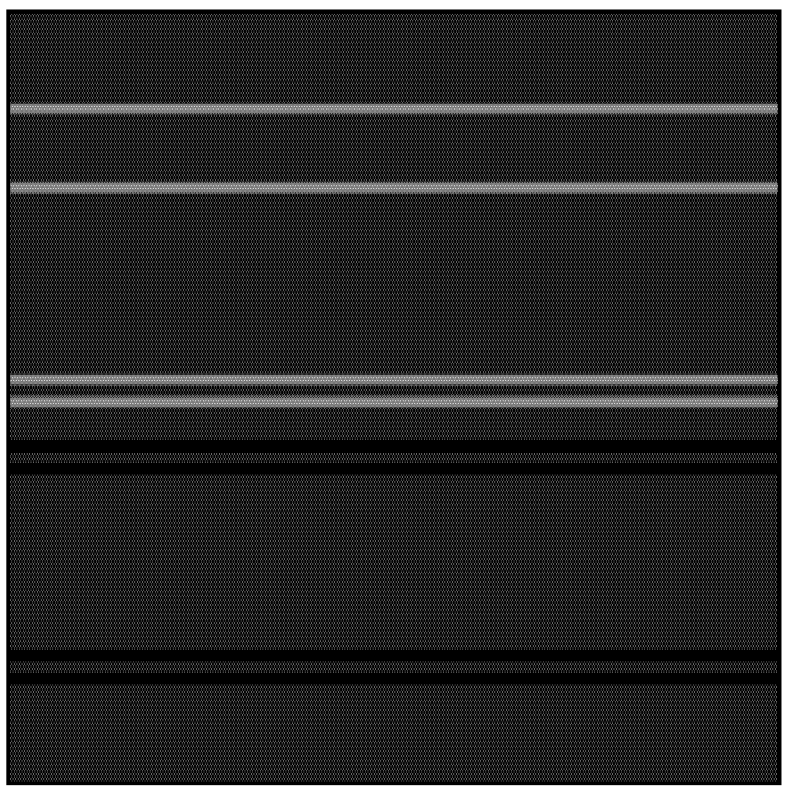
FIG. 13 is a diagram showing an output image.

The above is the contents of the processing performed by the filter processing unit 404 according to the present embodiment. FIG. 13 is a diagram showing the output image that is printed on a printing medium by the print image printing apparatus 311 based on the halftone image data generated by the halftone image data generation unit 406. It can be seen that the occurrence of moire is suppressed while suppressing the stripe unevenness at the low frequency due to the nozzle characteristic in the image printed with large dots whose diameter is larger than the nozzle interval compared to the solid image of the input pixel value $I_0$ as shown in FIG. 13.

Effects of the Present Embodiment

As above, in the present embodiment, it is possible to suppress the occurrence of moire by performing the filter processing using the LPF for the pixel value of the image data after the density correction processing for suppressing the stripe unevenness, and removing the high-frequency component in accordance with the frequency characteristic of the dot pattern.

In FIG. 3, the example of a case is shown where the image processing apparatus 300 and the print image printing apparatus 311 are separate apparatuses, but the image processing apparatus 300 may be incorporated in the print image printing apparatus 311. In that case, it is also possible to implement the function configuration of the image processing apparatus 300 shown in FIG. 4 by one or a plurality of circuits. Further, in the present embodiment, as the printing apparatus, the print image printing apparatus 311 of the full-line method is used, which includes a nozzle array whose length corresponds to the width in the y-direction of the printing medium, but it may also be possible to use a printing apparatus of the multi-pass method and the configuration of the print head is not limited.

Further, in the present embodiment, the pixel value is corrected so that the stripe unevenness due to the nozzle characteristic is suppressed by the processing to multiple the input pixel value $I_0$ whose tone value is inverted by the correction coefficient k, but the correction method is not limited to this. For example, it may also be possible to perform the correction by using a gamma correction table synchronized with the nozzle position. It is possible to cope with this case by performing the filter processing using the LPF for the output data column of the gamma table for the same input value and updating the gamma correction table based on the value after the filter processing.

Further, in the present embodiment, the Gaussian filter is used as the LPF, but the LPF is not limited to the Gaussian filter. For example, it may also be possible to use a moving average filter.

Further, in the present embodiment, the halftone image is generated by the dither processing, but the halftone processing at the time of generating the halftone image is not limited to this. For example, it may also be possible to generate the halftone image by using the error diffusion method.

Modification Example

In the first embodiment, the case is explained where image printing is performed with large dots of the same size, whose diameter is larger than the nozzle interval. Here, a case is explained as a modification example of the first embodiment where image forming is performed with large dots whose diameter is larger than the nozzle interval and with small dots whose diameter is smaller than the nozzle interval.

In a case where two kinds of dot size exist in a mixed manner, even though the filter processing is performed by using the filter of the single frequency characteristic, it may happen that moire occurs in the halftone image data obtained by the subsequent halftone processing.

Consequently, in the present modification example, for a pixel value $I_1$ that is printed with large dots, the filter processing is performed by using the LPF in accordance with the frequency characteristic of the dot pattern of the large dot and the halftone image data for large dots is generated based on the image data after the filter processing. On the other hand, for a pixel value $I_2$ that is printed with small dots, the filter processing is not performed and the halftone image data for small dots is generated based on the small-dot pixel value $I_2$. Due to this, in the present modification example, while suppressing the stripe unevenness due to the nozzle characteristic, the occurrence of moire in the halftone image in which large dots and small dots exist in a mixed manner is suppressed. Explanation of the contents common to those of the first embodiment is omitted, and in the following, different points are explained mainly.

<Function Configuration of Image Processing Apparatus>

Figure 14:
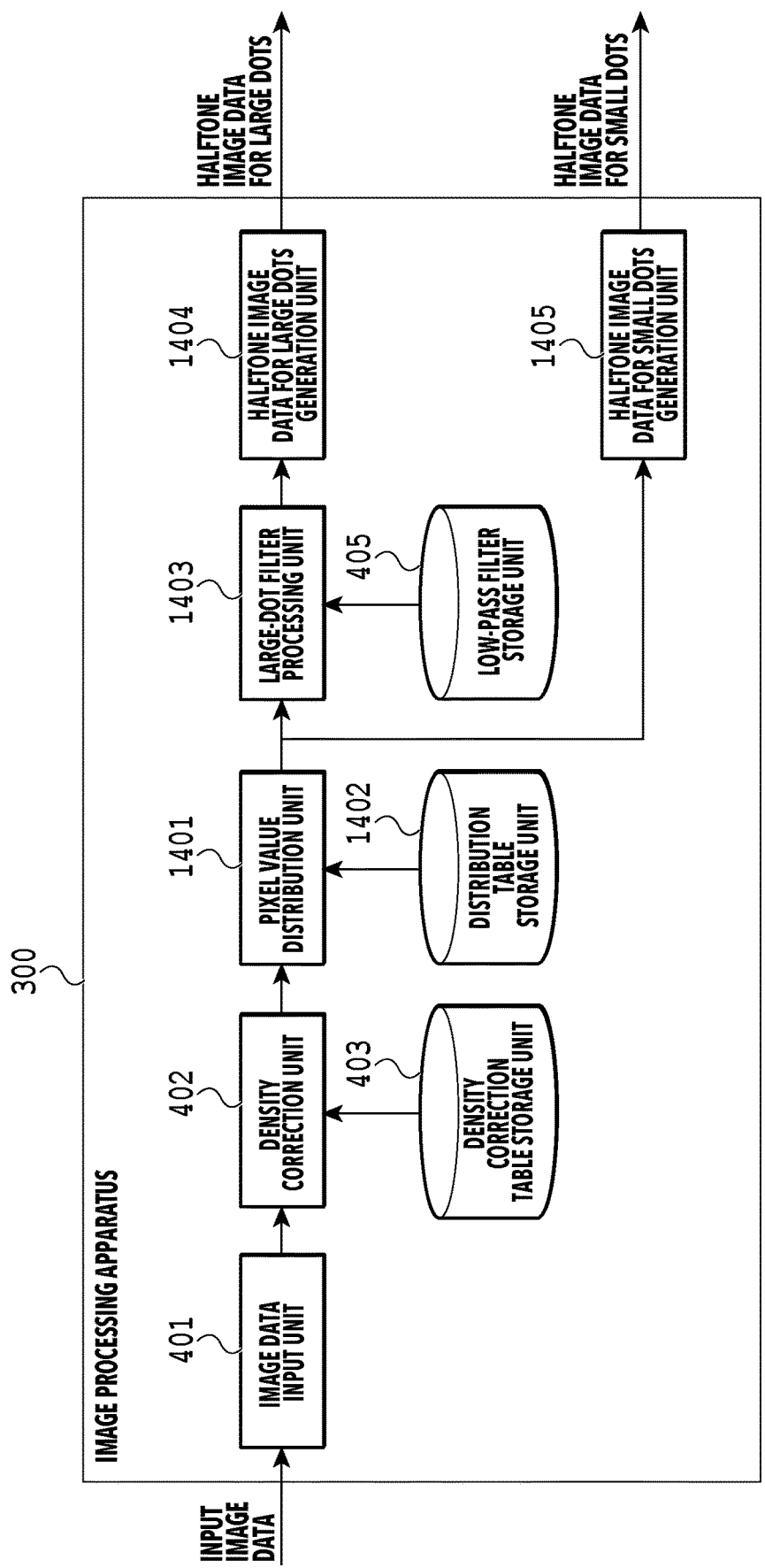
FIG. 14 is a block diagram showing a function configuration of the image processing apparatus.

FIG. 14 is a block diagram showing a detailed function configuration of the image processing apparatus 300 in the present modification example. The function configuration shown in FIG. 14 is implemented by the CPU 304 of the image processing apparatus 300 executing programs for implementing the function configuration or the function thereof. The image data input 401 is the same as that of the first embodiment, and, therefore, an explanation thereof is omitted.

The density correction unit 402 suppresses the stripe unevenness due to the nozzle characteristic by referring to the density correction table stored in advance in the density correction table storage unit 403 and correcting the input pixel value L. Then, the density correction unit 402 outputs the image data after the correction processing to a pixel value distribution unit 1401.

The pixel value distribution unit 1401 refers to a distribution table stored in advance in a distribution table storage unit 1402 and distributes a pixel value I of each pixel in the image data after the correction processing to the large-dot pixel value $I_1$ and the small-dot pixel value $I_2$. Then, the pixel value distribution unit 1401 outputs the large-dot pixel value $I_1$ to a large-dot filter processing unit 1403. Further, the pixel value distribution unit 1401 outputs the small-dot pixel value $I_2$ to a halftone image data for small dots generation unit 1405.

The large-dot filter processing unit 1403 performs the filter processing using the LPF acquired from the low-pass filter storage unit 405 for the large-dot pixel value Then, the large-dot filter processing unit 1403 outputs the image data after the filter processing to a halftone image data for large dots generation unit 1404.

The halftone image data for large dots generation unit 1404 generates halftone image data for large dots by performing the dither processing for the image data including the large-dot pixel value after the filter processing. Then, the halftone image data for large dots generation unit 1404 outputs the generated halftone image data for large dots to the print image printing apparatus 311 via the print image output unit 308.

The halftone image data for small dots generation unit 1405 generates halftone image data for small dots by performing the dither processing for the image data including the small-dot pixel value $I_2$. Then, the halftone image data for small dots generation unit 1405 outputs the generated halftone image data for small dots to the print image printing apparatus 311 via the print image output unit 308.

<Processing Performed by Image Processing Apparatus>

Figure 15:
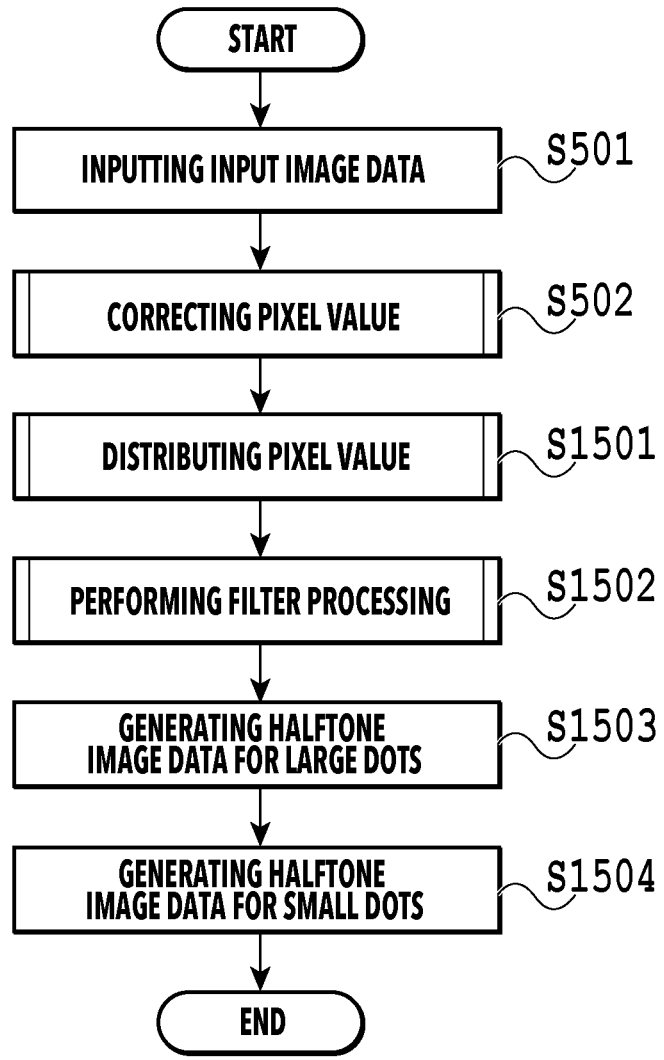
FIG. 15 is a flowchart of processing performed by the image processing apparatus.

FIG. 15 is a flowchart of processing performed by the image processing apparatus 300 in the present modification example. The flowchart shown in FIG. 15 is implemented by the control program stored in the storage unit 303 or the ROM 305 of the image processing apparatus 300 being read onto the RAM 306 and by the CPU 304 executing the program. Alternatively, it may also be possible to implement part or all of the functions at steps in FIG. 15 by hardware, such as an ASIC or an electronic circuit. In the processing performed by the image processing apparatus 300 in the present modification example, S501 and S502 are the same as the processing explained by using FIG. 5, and, therefore, an explanation is omitted. Each step is performed in order of S501, S502, S1501, S1502, S1503, and S1504.

At S1501, the pixel value distribution unit 1401 refers to the distribution table stored in advance in the distribution table storage unit 1402 and distributes the pixel value I of each pixel in the image data after the correction processing obtained at S502 to the large-dot pixel value $I_1$ and the small-dot pixel value $I_2$. Details of the distribution processing of the pixel value at this step will be described later by using FIG. 16.

At S1502, the large-dot filter processing unit 1403 performs the filter processing using the LPF created in advance in accordance with the frequency characteristic of the dot pattern of the large dot for the large-dot pixel value $I_1$.

At S1503, the halftone image data for large dots generation unit 1404 generates binary halftone image data for large dots by performing the dither processing for the image data after the filter processing obtained at S1502. Then, the halftone image data for large dots generation unit 1404 stores the generated halftone image data for large dots in a predetermined storage area.

At S1504, the halftone image data for small dots generation unit 1405 generates binary halftone image data for small dots by performing the dither processing for the image data including the small-dot pixel value $I_2$. Then, the halftone image data for small dots generation unit 1405 stores the generated halftone image data for small dots in a predetermined storage area.

<Processing Performed by Pixel Value Distribution Unit>

Figure 16:
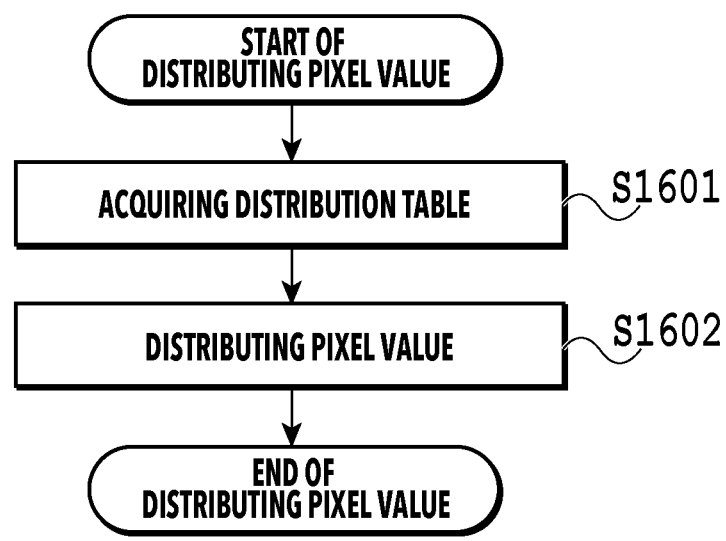
FIG. 16 is a flowchart of processing performed by a pixel value distribution unit.

FIG. 16 is a flowchart showing processing performed by the pixel value distribution unit 1401 in the present modification example. In the following, details of the processing to distribute the pixel value I of each pixel in the image data after the correction processing to the large-dot pixel value $I_1$ and the small-dot pixel value $I_2$ at S1501 are explained by using the flowchart in FIG. 16.

At S1601, the pixel value distribution unit 1401 acquires the distribution table stored in advance in the distribution table storage unit 1402.

Figures 17A, 17B:
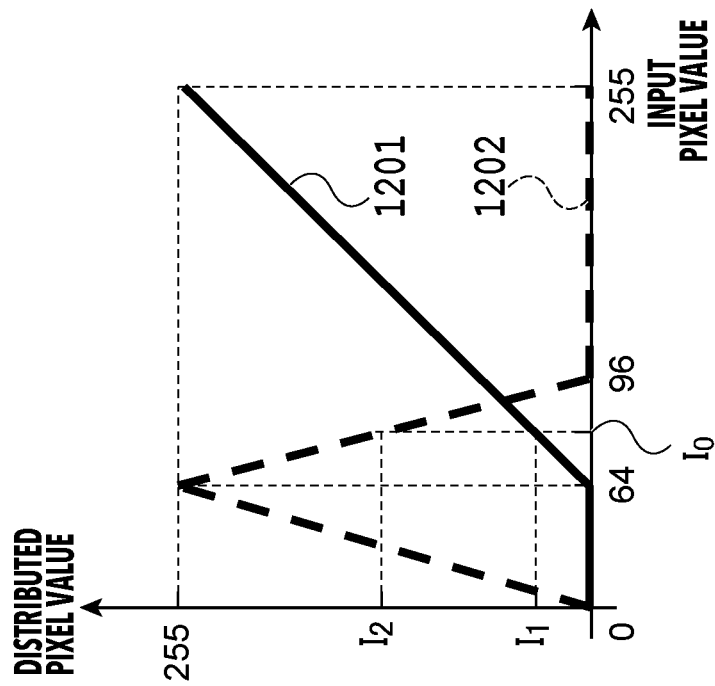
FIG. 17A is a diagram showing an example of a distribution table.
FIG. 17B is a diagram in which the distribution table is turned into a graph.

FIG. 17A shows an example of the distribution table. In the distribution table, the pixel value that is distributed to the large-dot pixel value $I_1$ and the pixel value that is distributed to the small-dot pixel value $I_2$ in each case where the input pixel value $I_0$ is from 0 to 255 are shown. FIG. 17B is a diagram showing the distribution table shown in FIG. 17A in a graph. In FIG. 17B, a solid line 1701 indicates the large-dot pixel value $I_1$ and a broken line 1702 indicates the small-dot pixel value $I_2$. In a case when the input pixel value $I_0$ is on the highlight side from 0 to 64, all the input pixel values $I_0$ are distributed to the small-dot pixel value $I_2$. Further, in a case when the input pixel value $I_0$ is from 64 to 96, the input pixel value $I_0$ is distributed to both the large-dot pixel value $I_1$ and the small-dot pixel value $I_2$. In the present modification example, the input pixel value $I_0$ satisfies $64 < I_0 < 96$.

At S1602, the pixel value distribution unit 1401 distributes the pixel value I of each pixel in the image data after the correction processing to the large-dot pixel value $I_1$ and the small-dot pixel value $I_2$ based on the distribution table acquired at S1601. Here, the large dot and the small dot are different in density per dot, and, therefore, $I=I_1+I_2$ does not hold. In a case when two kinds of dot that are used have the same size, $I=I_1+I_2$ holds.

FIG. 18A shows image data including the large-dot pixel value $I_1$. Further, FIG. 18B shows image data including the small-dot pixel value $I_2$.

Figure 19:
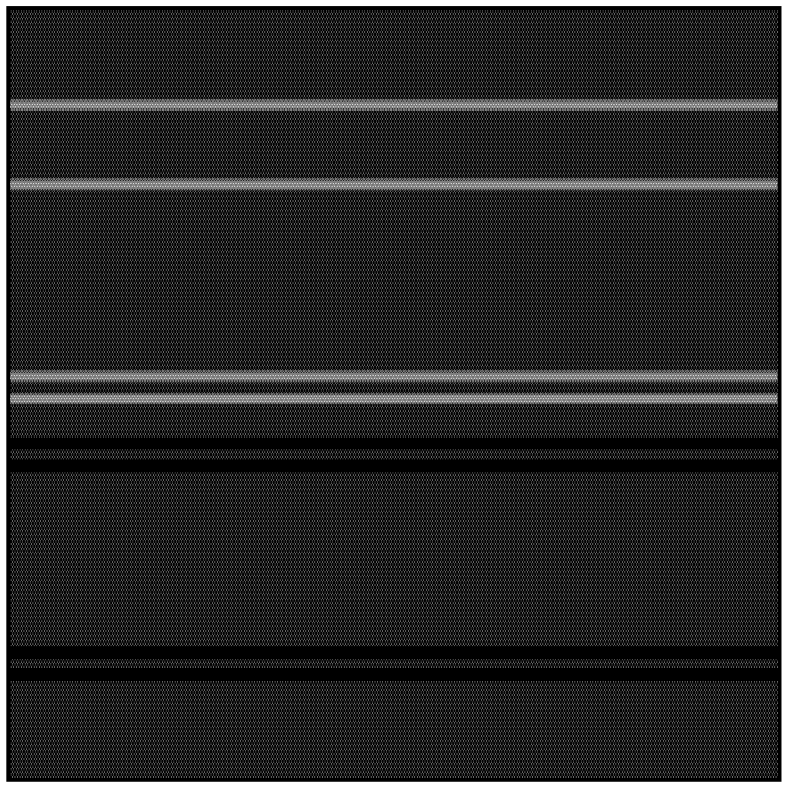
FIG. 19 is a diagram showing an output image.

The above is the contents of the processing performed by the pixel value distribution unit 1401 according to the present modification example. FIG. 19 is a diagram showing an output image printed on a printing medium by the print image printing apparatus 311 based on the halftone image data for large dots and the halftone image data for small dots in the present modification example. It can be seen that compared to the solid image of the input pixel value $I_0$ shown in FIG. 1, in the output image shown in FIG. 19, the occurrence of moire is suppressed while suppressing the low-frequency stripe unevenness due to the nozzle characteristic as in the output image shown in FIG. 13.

Effects of the Present Modification Example

As above, in the present modification example, the filter processing using the LPF is performed for the large-dot pixel value $I_1$ after distributing the pixel value of the image data after the density correction processing for suppressing the stripe unevenness. Due to this, also in a case when image formation is performed with large dot and small dots, as in the case of the above-described embodiment, it is possible to suppress the occurrence of moire due to interference with the dither pattern.

It may also be possible to take the small-dot pixel value $I_2$ as the target of the filter processing, in addition to the large-dot pixel value $I_1$. In this case, it is sufficient to use the LPF in accordance with the frequency characteristic of the dot pattern of the small dot for the small-dot pixel value $I_2$.

Further, in the present modification example, as the print image printing apparatus 311, the image printing apparatus is used, which prints dots of difference dot sizes by different amounts of ejected ink, but it may also be possible to use an image printing apparatus that ejects dark and pale inks different in density. Further, each dither pattern is not intended to limit the ejection amount or the density of the ink that is ejected by the print image printing apparatus 311.

Second Embodiment

In the first embodiment, the case is explained where the filter processing is performed by using the LPF in accordance with the frequency characteristic of the dot pattern of the large dot and moire in the halftone image is suppressed while suppressing the stripe unevenness due to the nozzle characteristic. However, there is a case when it is not possible to suppress the stripe unevenness by the density correction processing in accordance with the nozzle array characteristic in the first embodiment on a condition that stripe unevenness whose frequency is higher than the frequency at which moire is likely to occur has occurred in the dot pattern of the large dot.

Consequently, in the present embodiment, after performing the filter processing using the LPF in accordance with the frequency characteristic of the dot pattern of the large dot for the large-dot pixel value $I_1$, the large-dot pixel value that is removed by this filter processing is converted into the small-dot pixel value. Then, based on image data including a pixel value obtained by adding a converted small-dot pixel value $\Delta I_1'$ and the original small-dot pixel value $I_2$, halftone image data for small dots is generated. Due to this, in the present embodiment, it is made possible to suppress the occurrence of moire in the halftone image while suppressing the stripe unevenness as well in the high-frequency component, which cannot be corrected by the large dot. Explanation of the contents common to those of the first embodiment is omitted and, in the following, different points are explained mainly.

<Function Configuration of Image Processing Apparatus>

Figure 20:
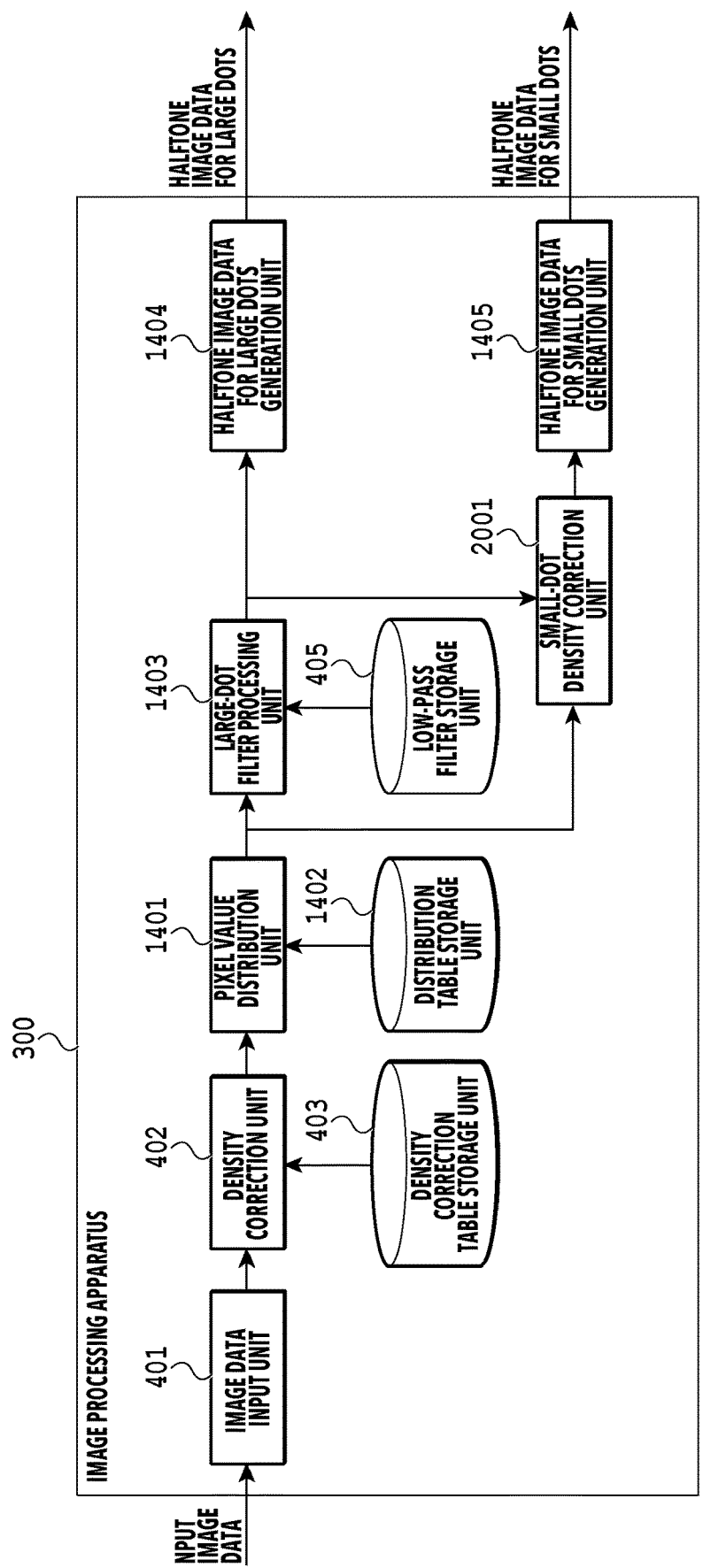
FIG. 20 is a block diagram showing a function configuration of the image processing apparatus.

FIG. 20 is a block diagram showing a detailed function configuration of the image processing apparatus 300 in the present embodiment. The function configuration shown in FIG. 20 is implemented by the CPU 304 of the image processing apparatus 300 executing programs for implementing the function configuration or the function thereof. Further, the image data input unit 401, the density correction unit 402, and the halftone image data for large dots generation unit 1404 are the same as those of the modification example of the first embodiment, and, therefore, an explanation thereof is omitted.

The pixel value distribution 1401 refers to the distribution table stored in advance in the distribution table storage unit 1402 and distributes the pixel value I of each pixel in the image data after the correction processing of stripe unevenness to the large-dot pixel value $I_1$ and the small-dot pixel value $I_2$. Then, the pixel value distribution 1401 outputs the large-dot pixel value $I_1$ to the large-dot filter processing unit 1403 and a small-dot density correction unit 2001. Further, the pixel value distribution 1401 outputs the small-dot pixel value $I_2$ to the small-dot density correction unit 2001.

The large-dot filter processing unit 1403 performs the filter processing by using the LPF acquired from the low-pass filter storage unit 405 for the large-dot pixel value $I_1$. Due to this, a large-dot pixel value $I_1'$ after the filter processing is derived. Then, the large-dot filter processing unit 1403 outputs the large-dot pixel value $I_1'$ to the halftone image data for large dots generation unit 1404 and the small-dot density correction unit 2001.

The small-dot density correction unit 2001 derives a difference value $\Delta I_1$ between the large-dot pixel value $I_1$ and the large-dot pixel value $I_1'$. Further, the small-dot density correction unit 2001 derives the small-dot correction difference value $\Delta I_1'$ that can be printed with small dots by multiplying the large-dot difference value $\Delta I_1$ by a density ratio $\alpha$. The density ratio $\alpha$ is a ratio of the density of black between the black solid output image printed with large dots and the black solid output image printed with small dots and derived in advance. Further, the small-dot density correction unit 2001 derives a small-dot correction pixel value $I_{2+\Delta}$ by adding the small-dot correction difference value $\Delta I_1'$ and the small-dot pixel value $I_2$. Then, the small-dot density correction unit 2001 outputs the small-dot correction pixel value $I_{2+\Delta}$ to the halftone image data for small dots generation unit 1405.

The halftone image data for small dots generation unit 1405 generates halftone image data for small dots by performing the dither processing for the image data including the small-dot correction pixel value $I_{2+\Delta}$. Then, the halftone image data for small dots generation unit 1405 outputs the halftone image data for small dots to the print image printing apparatus 311 via the print image output unit 308.

<Processing Performed by Image Processing Apparatus>

Figure 21:
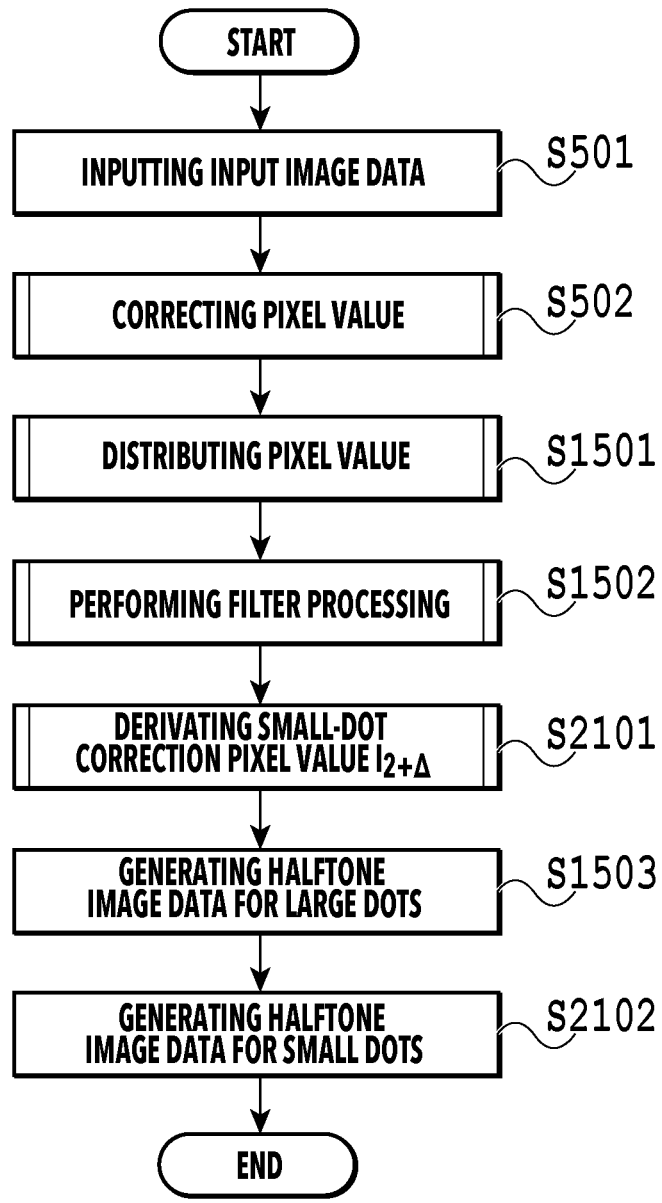
FIG. 21 is a flowchart of processing performed by the image processing apparatus.

FIG. 21 is a flowchart of processing performed by the image processing apparatus 300 in the present embodiment. The flowchart shown in FIG. 21 is implemented by the control program stored in the storage unit 303 or the ROM 305 of the image processing apparatus 300 being read onto the RAM 306 and by the CPU 304 executing the program. Alternatively, it may also be possible to implement part or all of the functions at steps in FIG. 21 by hardware, such as an ASIC or an electronic circuit. In the processing performed by the image processing apparatus 300 in the present embodiment, the processing at steps other than S2101 and S2102 is the same as the processing explained by using FIG. 15, and, therefore, an explanation is omitted. Further, each step is performed in order of S501, S502, S1501, S1502, S2101, S1503, and S2102.

At S2101, the small-dot density correction unit 2001 derives the small-dot correction pixel value $I_{2+\Delta}$. Details of the derivation processing at this step will be described later by using FIG. 22.

At S2102, the halftone image data for small dots generation unit 1405 generates halftone image data for small dots by performing the dither processing for the image data including the small-dot correction pixel value $I_{2+\Delta}$. Then, the halftone image data for small dots generation unit 1405 stores the halftone image data for small dots in a predetermined storage area.

<Processing Performed by Small-Dot Density Correction Unit>

Figure 22:
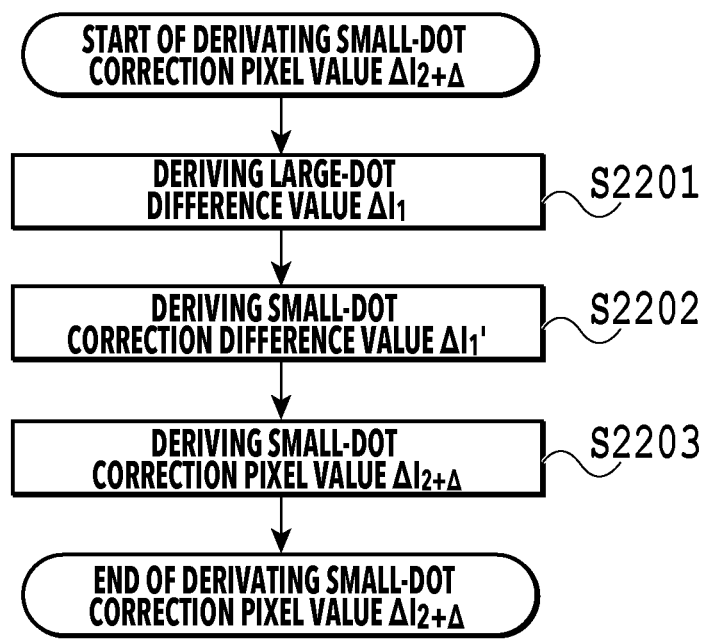
FIG. 22 is a flowchart of processing performed by a small-dot density correction unit.

FIG. 22 is a flowchart of processing performed by the small-dot density correction unit 2001 in the present embodiment. In the following, details of the processing to derive the small-dot correction pixel value $I_{2+\Delta}$ at S2101 are explained by using the flowchart in FIG. 22.

Figure 23:
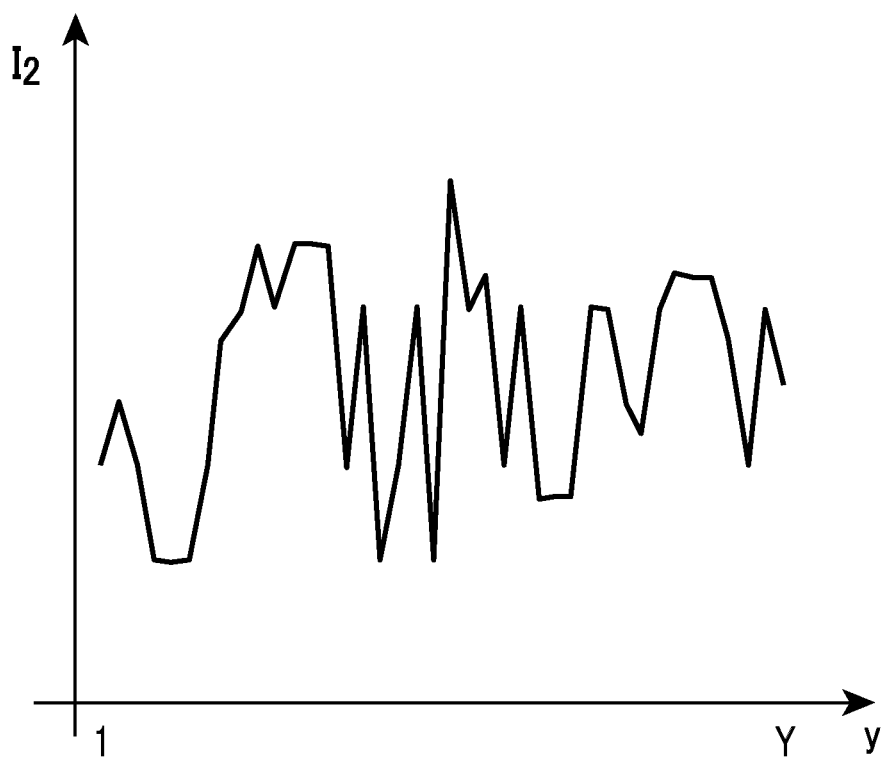
FIG. 23 is a diagram showing an x-direction average value of a pixel value $I_2$ corresponding to each pixel position in the y-direction.

FIG. 23 is a diagram showing a value obtained by averaging in the x-direction the small-dot pixel value $I_2$, which corresponds to each pixel position in the y-direction of the image data including the small-dot pixel value $I_2$ shown in FIG. 18B.

At S2201, the small-dot density correction unit 2001 derives the large-dot difference value $\Delta I_1$ in accordance with formula (3) below.

[Mathematical formula 3]

$$\Delta I_1 = I_1 - I_1' \qquad \text{formula (3)}$$

Figure 24:
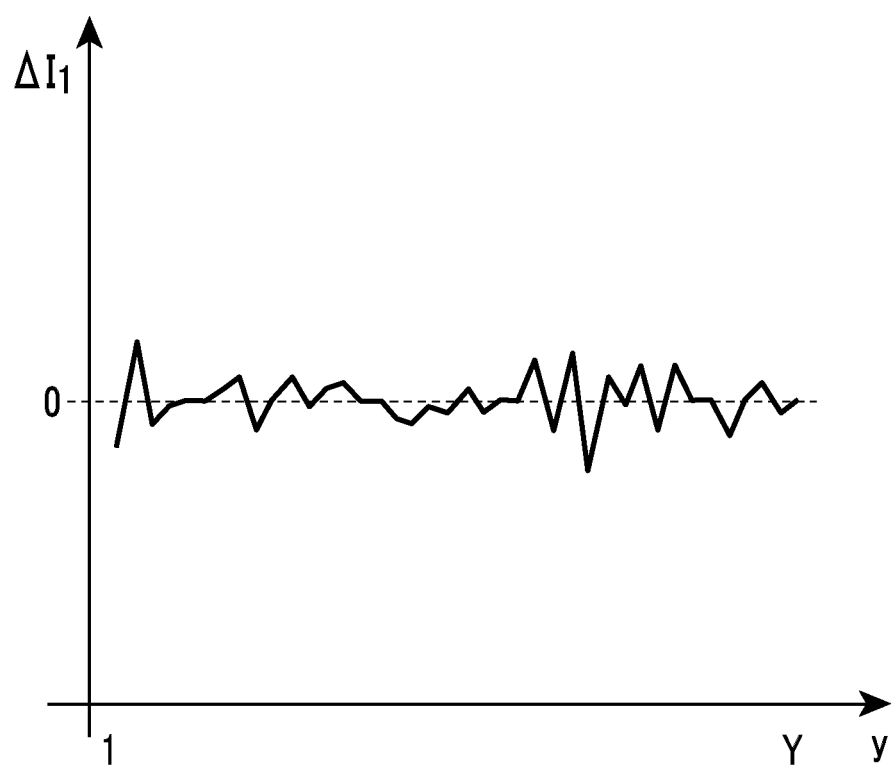
FIG. 24 is a diagram showing an x-direction average value of a difference value $\Delta I_1$ corresponding to each pixel position in the y-direction.

FIG. 24 is a diagram showing a value obtained by averaging in the x-direction the large-dot difference value $\Delta I_1$, which corresponds to each pixel position in the y-direction. In the present embodiment, as shown in FIG. 24, the stripe unevenness in the high-frequency component, which cannot be corrected by the large dot, is derived as the large-dot difference value $\Delta I_1$.

At S2202, the small-dot density correction unit 2001 converts the large-dot difference value $\Delta I_1$ into the small-dot correction difference value $\Delta I_1'$ in accordance with formula (4) below.

[Mathematical formula 4]

$$\Delta I_1' = \alpha \Delta I_1 \qquad \text{formula (4)}$$

This small-dot correction difference value $\Delta I_1'$ is the small-dot pixel value for correcting the stripe unevenness in the high-frequency component, which cannot be corrected by the large dot.

At S2203, the small-dot density correction unit 2001 derives the small-dot correction pixel value $I_{2+\Delta}$ in accordance with formula (5).

[Mathematical formula 5]

$$I_{2+\Delta} = I_2 + \Delta I_1' \qquad \text{formula (5)}$$

Figure 25:
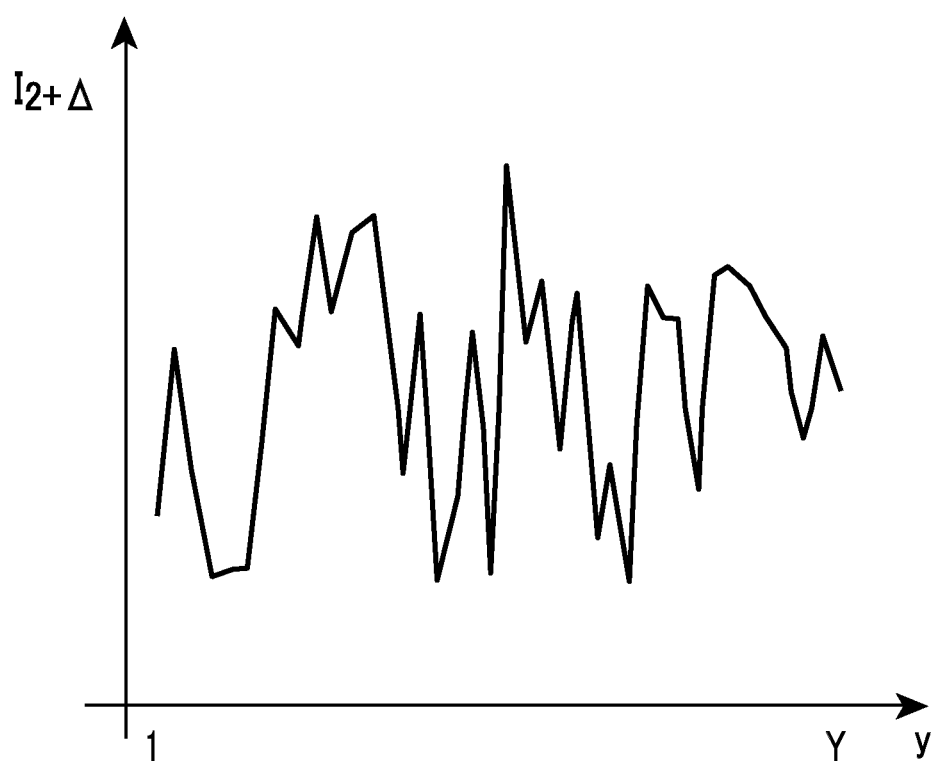
FIG. 25 is a diagram showing an x-direction average value of a correction pixel value $I_{2+\Delta}$ corresponding to each pixel position in the y-direction.

The above is the contents of the processing performed by the small-dot density correction unit 2001 according to the present embodiment. FIG. 25 is a diagram showing a value obtained by averaging in the x-direction the small-dot correction pixel value $I_{2+\Delta}$, which corresponds to each pixel position in the y-direction. In the present embodiment, as shown in FIG. 25, the small-dot correction pixel value $I_{2+\Delta}$ is a value obtained by adding the high-frequency component that cannot be corrected by the large dot.

Effects of the Present Embodiment

As above, in the present embodiment, the difference value between the large-dot pixel value after the filter processing is performed by using the LPF and the original large-dot pixel value is converted into the small-dot correction difference value $\Delta I_1'$. Then, image data having the correction pixel value $I_{2+\Delta}$ obtained by adding the converted small-dot correction difference value $\Delta I_1'$ and the original small-dot pixel value $I_2$ as the pixel value of each pixel is obtained and based on the image data, the halftone image data for small dots is generated. Due to this, it is possible to suppress the occurrence of moire while suppressing also the stripe unevenness in the high-frequency component, which cannot be corrected by the large dot.

Modification Example

In the second embodiment, the case is explained where the stripe unevenness in the high-frequency component, which cannot be corrected by the large dot, is corrected by the small dot. However, there is a case where the density that the small dot can print is not sufficient for the derived small-dot correction difference value $\Delta I_1'$. In this case, it is meant that the stripe unevenness in the high-frequency component, which cannot be corrected by the large dot, cannot be corrected sufficiently.

Consequently, in the present modification example, for the pixel value I in the image data after the correction processing of stripe unevenness, the filter processing using a high-pass filter (in the following, also referred to as "HPF") in accordance with the frequency characteristic of the dot pattern of the small dot is performed. After that, for the large-dot pixel value, the filter processing using the LPF in accordance with the frequency characteristic of the dot pattern of the large dot is performed. Then, binary halftone image data for small dots is generated by performing the dither processing for the image data including the small-dot pixel value after the filter processing. Further, binary halftone image data for large dots is generated by performing the dither processing for the image data including the large-dot pixel value after the filter processing. As a result of this, the stripe unevenness in the high-frequency component, which cannot be corrected by the large dot, is corrected by the halftone image data for small dots and the stripe unevenness in the low-frequency component is printed by the halftone image data for large dots. Further, this halftone image data for large dots prints the high-density image that cannot be printed with small dots. Due to this, in the present embodiment, even in a case when the density that can be printed with small dots is not sufficient, the occurrence of moire in the halftone image is suppressed while suppressing the stripe unevenness due to the nozzle characteristic including the stripe unevenness in the high-frequency component, which cannot be corrected by the large dot. The same symbol is attached to the same configuration as that of the first embodiment and the second embodiment and a detailed explanation thereof is omitted.

<Function Configuration of Image Processing Apparatus>

Figure 26:
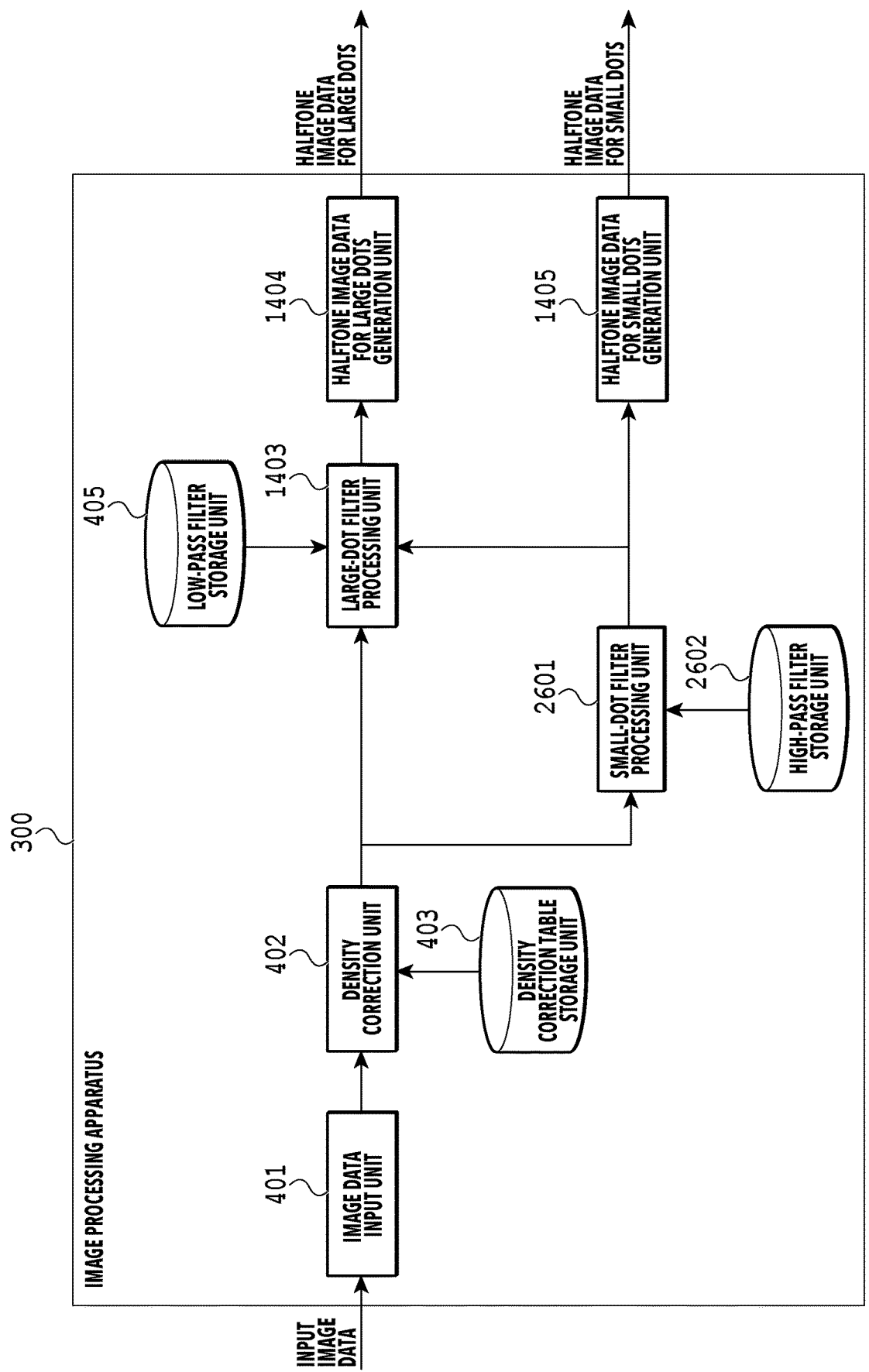
FIG. 26 is a block diagram showing a function configuration of the image processing apparatus.

FIG. 26 is a block diagram showing a detailed function configuration of the image processing apparatus 300 in the present modification example. The function configuration shown in FIG. 26 is implemented by the CPU 304 of the image processing apparatus 300 executing programs for implementing the function configuration or the function thereof. The image data input 401 is the same as that of the first embodiment and the second embodiment, and, therefore, an explanation thereof is omitted.

The density correction unit 402 outputs image data after the correction processing of stripe unevenness to the large-dot filter processing unit 1403 and a small-dot filter processing unit 2601.

The small-dot filter processing unit 2601 performs filter processing using an HPF acquired from a high-pass filter storage unit 2602 for the pixel value I of the image data after the correction processing in accordance with the frequency characteristic of the dot pattern of the small dot. Due to this, the small-dot filter processing unit 2601 derives a small-dot pixel value $I_{HPF}$ after the filter processing. Then, the small-dot filter processing unit 2601 outputs the small-dot pixel value $I_{HPF}$ after the filter processing to the large-dot filter processing unit 1403 and the halftone image data for small dots generation unit 1405.

The large-dot filter processing unit 1403 derives a difference value 412 between the pixel value I of each pixel in the image data after the correction processing and the small-dot pixel value $I_{HPF}$ after the filter processing. Further, the large-dot filter processing unit 1403 derives a large-dot correction difference value $\Delta I_2'$ by multiplying the small-dot difference value $\Delta I_2$ by the reciprocal number of the density ratio α. Furthermore, the large-dot filter processing unit 1403 performs the filter processing using the LPF acquired from the low-pass filter storage unit 405 for the large-dot correction difference value $\Delta I_2'$ in accordance with the frequency characteristic of the dot pattern of the large dot. Due to this, the large-dot filter processing unit 1403 derives a large-dot pixel value $I_{LPF}$ after the filter processing. Then, the large-dot filter processing unit 1403 outputs the image data including the large-dot pixel value $I_{LPF}$ after the filter processing to the halftone image data for large dots generation unit 1404.

The halftone image data for large dots generation unit 1404 generates halftone image data for large dots by performing the dither processing for the image data including the large-dot pixel value $I_{LPF}$ after the filter processing. Then, the halftone image data for large dots generation unit 1404 outputs the generated halftone image data for large dots to the print image printing apparatus 311 via the print image output unit 308.

The halftone image data for small dots generation unit 1405 generates halftone image data for small dots by performing the dither processing for the image data including the small-dot pixel value $I_{HPF}$ after the filter processing. Then, the halftone image data for small dots generation unit 1405 outputs the generated halftone image data for small dots to the print image printing apparatus 311 via the print image output unit 308.

<Processing Performed by Image Processing Apparatus>

Figure 27:
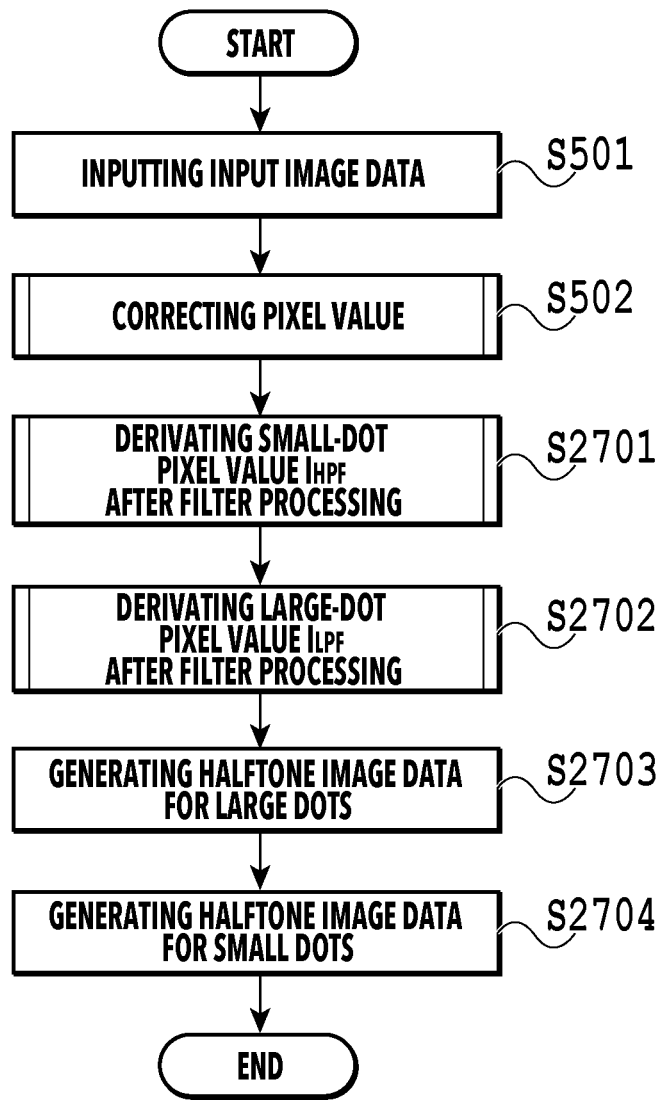
FIG. 27 is a flowchart of processing performed by the image processing apparatus.

FIG. 27 is a flowchart of processing performed by the image processing apparatus 300 in the present modification example. The flowchart shown in FIG. 27 is implemented by the control program stored in the storage unit 303 or the ROM 305 of the image processing apparatus 300 being read onto the RAM 306 and by the CPU 304 executing the program. Alternatively, it may also be possible to implement part or all of the functions at steps in FIG. 27 by hardware, such as an ASIC or an electronic circuit. In the processing performed by the image processing apparatus 300 in the present modification example, S501 and S502 are the same as the processing explained by using FIG. 21, and, therefore, an explanation is omitted. Each step is performed in order of S501, S502, S2701, S2702, S2703, and S2704.

At S2701, the small-dot filter processing unit 2601 derives the small-dot pixel value $I_{HPF}$ after the filter processing by performing the filter processing using the HPF for the pixel value I of each pixel in the image data after the correction processing. Details of the derivation processing at this step will be described later by using FIG. 28.

At S2702, the large-dot filter processing unit 1403 derives the large-dot pixel value $I_{LPF}$ after the filter processing based on the small-dot difference value $\Delta I_2$ and the density ratio α. Details of the derivation processing at this step will be described later by using FIG. 32.

At S2703, the halftone image data for large dots generation unit 1404 generates binary halftone image data for large dots by performing the dither processing for the image data including the large-dot pixel value $I_{LPF}$ after the filter processing. The halftone image data for large dots generation unit 1404 stores the generated halftone image data for large dots in a predetermined storage area.

At S2704, the halftone image data for small dots generation unit 1405 generates binary halftone image data for small dots by performing the dither processing for the image data including the small-dot pixel value $I_{HPF}$ after the filter processing. The halftone image data for small dots generation unit 1405 stores the generated halftone image data for small dots in a predetermined storage unit.

<Processing Performed by Small-Dot Filter Processing Unit>

Figure 28:
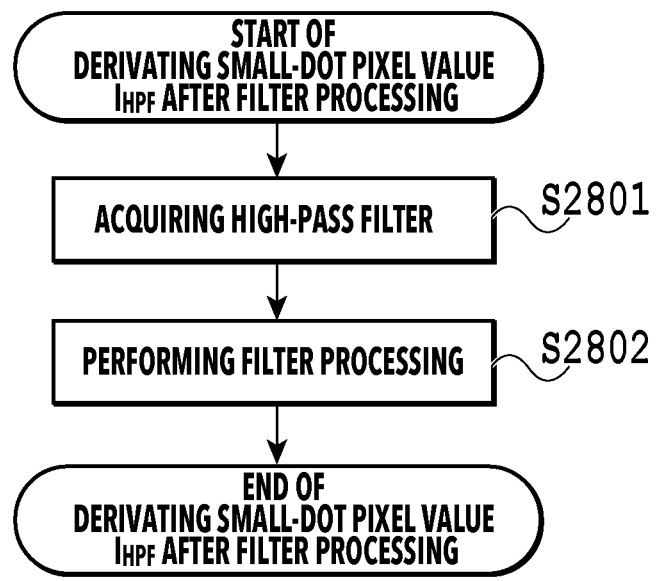
FIG. 28 is a flowchart of processing performed by a small-dot filter processing unit.

FIG. 28 is a flowchart of processing performed by the small-dot filter processing unit 2601 in the present modification example. In the following, details of the processing to derive the small-dot pixel value $I_{HPF}$ after the filter processing at S2701 are explained by using the flowchart in FIG. 28.

At S2801, the small-dot filter processing unit 2601 acquires the HPF that is applied to the pixel value I of each pixel in the image data after the correction processing from the high-pass filter storage unit 2602.

Figure 29:
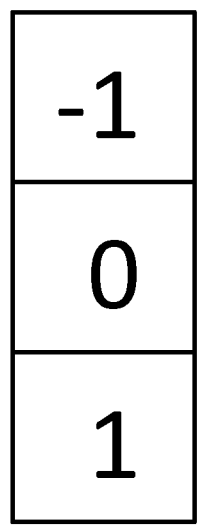
FIG. 29 is a diagram showing a filter coefficient of an HPF.

FIG. 29 is a diagram showing a sobel filter that is one-dimensional in the y-direction. Here, the sobel filter that is one-dimensional in the y-direction shown in FIG. 29 is used as the HPF. The sobel filter having a filter coefficient shown in FIG. 29 is created in advance as the HPF and stored in the small-dot filter processing unit 2601.

At S2802, the small-dot filter processing unit 2601 derives the small-dot pixel value $I_{HPF}$ after the filter processing by performing the filter processing using the HPF for the pixel value I of each pixel in the image data after the correction processing. Then, the small-dot filter processing unit 2601 stores the small-dot pixel value $I_{HPF}$ after the filter processing in a predetermined storage area. Further, the small-dot filter processing unit 2601 derives a small-dot pixel value $I_2$ (p) that corrects stripe unevenness in accordance with formula (6) below.

[Mathematical formula 6]

$$I_2(p)=I_{HPF}-\min(I_{HPF}) \quad \text{formula (6)}$$

In formula (6) described above, min ($I_{HPF}$) is the minimum value of the small-dot pixel value $I_{HPF}$ after the filter processing.

Figure 30:
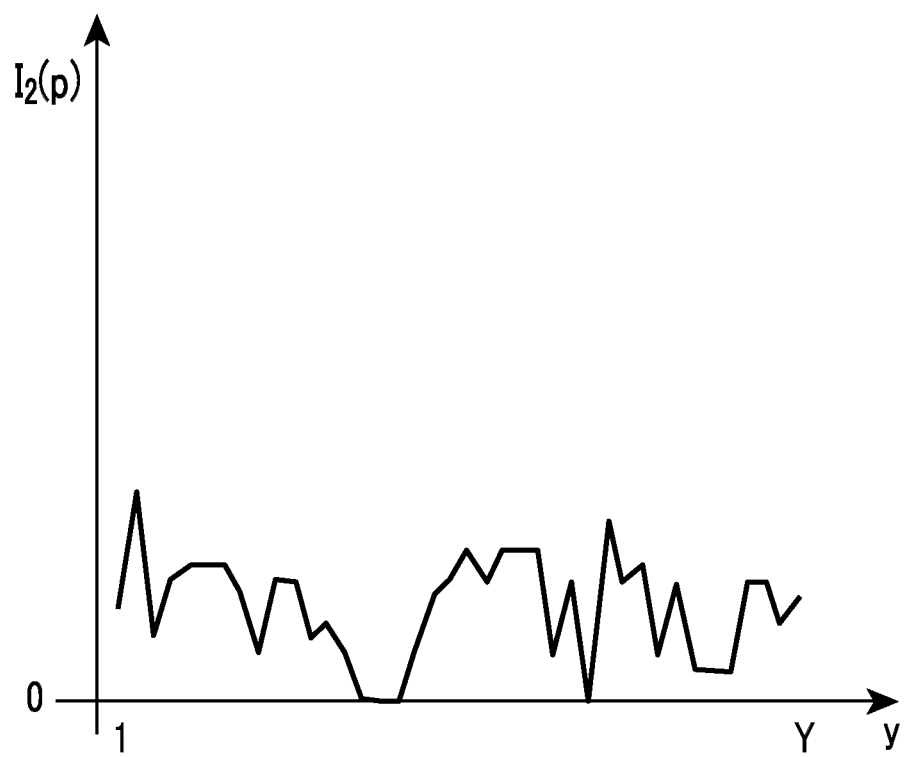
FIG. 30 is a diagram showing a small-dot pixel value $I_2$ (p)

FIG. 30 is a diagram showing a value obtained by averaging in the x-direction the small-dot pixel value $I_2$ (p), which corresponds to each pixel position in the y-direction. In the present modification example, the small-dot pixel value $I_2$ (p) is a difference value between the small-dot pixel value $I_{HPF}$ after the filter processing and min ($I_{HPF}$) that is the minimum value thereof and is offset so as to take a value not less than 0.

Figure 31:
FIG. 31 is a diagram showing an image that the small-dot filter processing unit outputs.

The above is the contents of the processing performed by the small-dot filter processing unit 2601 according to the present embodiment example. FIG. 31 is a diagram showing the image after the filter processing using the HPF and an edge image whose frequency of the change in the pixel value accompanying the density unevenness is high is shown.

<Processing Performed by Large-Dot Filter Processing Unit>

Figure 32:
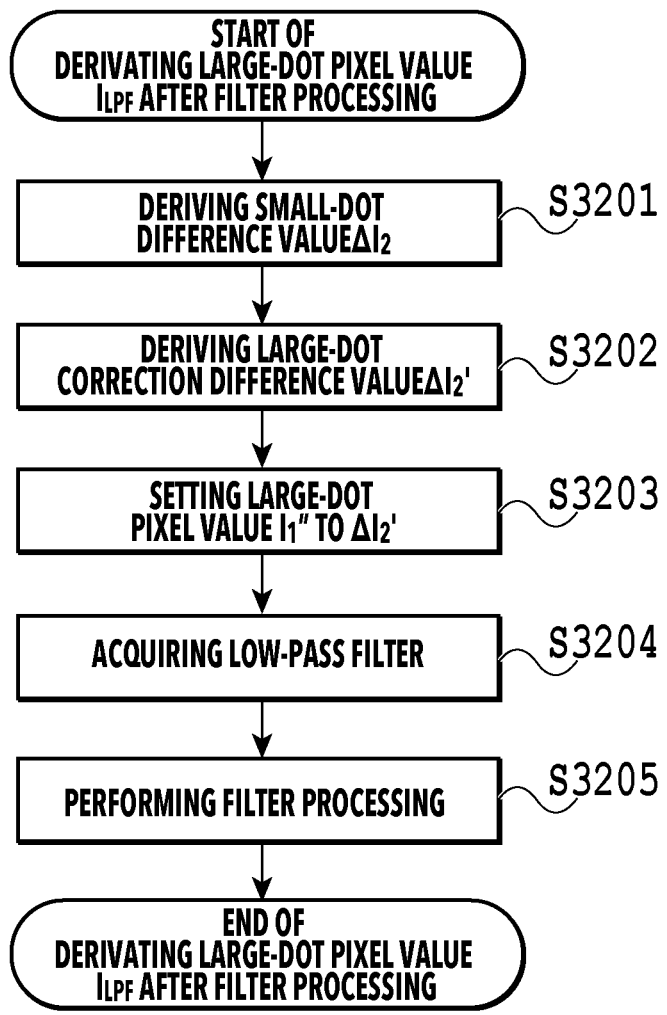
FIG. 32 is a flowchart of processing performed by a large-dot filter processing unit.

FIG. 32 is a flowchart of processing performed by the large-dot filter processing unit 1403 in the present modification example. In the following, details of the processing to derive the large-dot pixel value $I_{LPF}$ after the filter processing at S2702 are explained by using the flowchart in FIG. 32.

At S3201, the large-dot filter processing unit 1403 derives the small-dot difference value $\Delta I_2$ in accordance with formula (7) below.

[Mathematical formula (7)]

$$\Delta I_2=I-I_{HPF} \quad \text{formula (7)}$$

Figure 33:
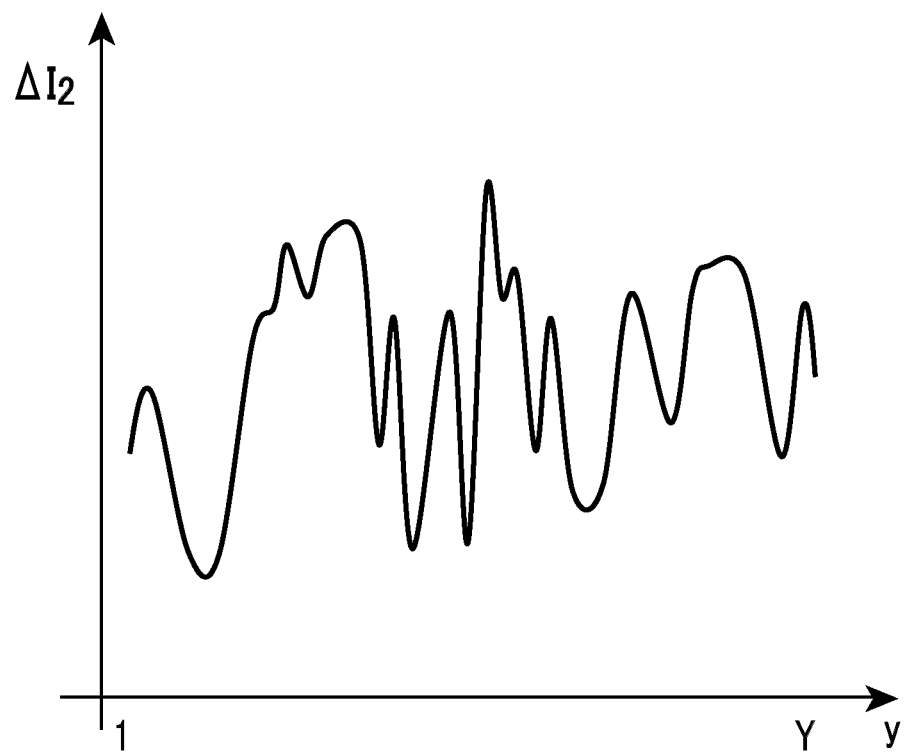
FIG. 33 is a diagram showing an x-direction average value of a difference value $\Delta I_2$ corresponding to each pixel position in the y-direction.

FIG. 33 is a diagram showing the small-dot difference value 412 averaged in the x-direction, which corresponds to each pixel position in the y-direction. In FIG. 33, the pixel value for printing a high-density image that cannot be printed with small dots with large dots is shown as the small-dot difference value $\Delta I_2$.

At S3202, the large-dot filter processing unit 1403 converts the small-dot difference value $\Delta I_2$ into the large-dot correction difference value $\Delta I_2'$ in accordance with formula (8) below.

[Mathematical formula 8]

$$\Delta I_2'=1/\alpha \Delta I_2 \quad \text{formula (8)}$$

This large-dot correction difference value $\Delta I_2'$ is the large-dot pixel value that corrects the stripe unevenness in the low-frequency component. Further, by this large-dot correction difference value $\Delta I_2'$, a high-density image that cannot be printed with small dots is printed with large dots.

At S3203, the large-dot filter processing unit 1403 sets the large-dot correction difference value $\Delta I_2'$ to a large-dot pixel value $I_1''$ in accordance with formula (9) below.

[Mathematical formula 9]

$$I_1''=\Delta I_2' \quad \text{formula (9)}$$

At S3204, the large-dot filter processing unit 1403 acquires the LPF that is applied to the large-dot pixel value $I_1''$ from the low-pass filter storage unit 405.

At S3205, the large-dot filter processing unit 1403 derives the large-dot pixel value $I_{LPF}$ after the filter processing by performing the filter processing using the LPF acquired at S3204 for the large-dot pixel value $I_1''$. The above is the contents of the processing performed by the large-dot filter processing unit 1403 according to the present embodiment.

Effects of the Present Modification Example

As above, in the present modification example, after deriving the small-dot pixel value $I_{HPF}$ after the filter processing, the large-dot pixel value $I_{LPF}$ after the filter processing is derived. Then, the stripe unevenness in the high-frequency component, which cannot be corrected by the large dot, is corrected by the halftone image dada for small dots. Further, the stripe unevenness in the low-frequency component is corrected by the halftone image data for large dots. Furthermore, by this halftone image data for large dots, a high-density image that cannot be printed with small dots is printed. Due to this, in the present modification example, even in a case when the density that can be printed with small dots is insufficient, it is possible to suppress the occurrence of moire in the halftone image while suppressing the stripe unevenness due to the nozzle characteristic including the stripe unevenness in the high-frequency component, which cannot be corrected by the large dot.

Further, as described previously, the pixel value $I_2$ ($p$) is offset so as to take a value not less than zero. Because of this, the pixel area on the highlight side is printed with small dots whose granularity is good and the pixel area on the shadow side is printed with large dots. As a result of that, the effect of the function separation appears secondarily in which the large dot is in charge of the suppression of the stripe unevenness in the low-frequency component and the high density printing on the shadow side and the small dot is in charge of the suppression of the stripe unevenness in the high-frequency component and the printing whose granularity is good on the highlight side.

In the present modification example, the filter processing using the HPF in accordance with the frequency characteristic of the dot pattern of the small dot is performed for the pixel value I of the image data after the correction processing, but the filter that is used for this filter processing is not limited to the HPF. For example, in a case when the stripe unevenness whose frequency is higher than the frequency at which moire is likely to occur in the dot pattern of the small dot occurs, it may also be possible to further apply an LPF in accordance with the frequency characteristic of the dot pattern of the small dot, in addition to the HPF described previously. Further, it may also be possible to use a bandpass filter that is a combination of the HPF in accordance with the frequency characteristic of the dot pattern of the small dot and the LPF in accordance with the frequency characteristic of the dot pattern of the small dot.

Other Embodiments

Embodiment(s) of the present disclosure can also be realized by a computer of a system or an apparatus that reads out and executes computer executable instructions (e.g., an one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the technique of the present disclosure, even in a case when the dot size that is printed on a printing medium is larger than the nozzle interval, it is possible to suppress the occurrence of moire in a halftone image while suppressing density unevenness due to the nozzle characteristic.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus converting input image data into halftone image data that a plurality of arranged nozzles ejecting ink can print, the image processing apparatus comprising:
   one or more hardware processors; and
   one or more memories storing one or more programs configured to be executed by the one or more hardware processors, the one or more programs including instructions for:
      correcting a pixel value of each pixel in the input image data in accordance with a characteristic of the nozzle; and
      generating first halftone image data by performing halftone processing for a second frequency component whose frequency is lower than that of a first frequency component of frequency components corresponding to the corrected input image data,
   wherein the first halftone image data is data that is generated to be printed with first dots whose dot size causes adjacent dots to overlap.

2. The image processing apparatus according to claim 1, wherein
   a pixel value in the input image data is corrected for each pixel position in a direction parallel to a direction in which the nozzles are arranged.

3. The image processing apparatus according to claim 2, wherein
   the second frequency component is obtained by performing filter processing for a pixel value of the input image data by a first filter and
   the first filter is a one-dimensional filter in a direction parallel to a direction in which the nozzles are arranged.

4. The image processing apparatus according to claim 3, wherein
   the one-dimensional filter is a Gaussian filter.

5. The image processing apparatus according to claim 3, wherein
   the one or more programs further include instructions for:
      distributing a pixel value of each pixel in the corrected image data to a first pixel value that is printed with the first dots and a second pixel value that is printed with the second dots smaller than the first dot; and
      generating second halftone image data by performing halftone processing for the second pixel values,
   wherein filter processing using the first filter is performed for the first pixel value and
   the first halftone image data is generated by performing halftone processing for the first pixel value after filter processing.

6. The image processing apparatus according to claim 5, wherein
   the one or more programs further include instructions for adding a difference value between a pixel value after filter processing using the first filter is performed for the first pixel value and the first pixel value to the second pixel value.

7. The image processing apparatus according to claim 5, wherein
   the one or more programs further include instructions for performing filter processing using a second filter having a predetermined frequency characteristic for a pixel value of the corrected image data,
   wherein the second filter is a high-pass filter that removes a low-frequency component in accordance with a dot pattern of the second dot.

8. The image processing apparatus according to claim 7, wherein
   the second filter has a frequency characteristic of a bandpass filter that removes a low-frequency component in accordance with density that the second dot can print and a high-frequency component in accordance with a dot pattern of the second dot.

9. The image processing apparatus according to claim 7, wherein
   a difference value between a pixel value after filter processing using the second filter is performed for a pixel value of the corrected image data and a pixel value of the corrected image data is set to the first pixel value.

10. The image processing apparatus according to claim 1, wherein
the halftone processing is dither processing.

11. The image processing apparatus according to claim 1, wherein
a pixel value in the input image data is corrected for each pixel position in a direction perpendicular to a direction in which the nozzles are arranged.

12. The image processing apparatus according to claim 1, wherein
a dot size of the first dot is larger than an interval of the plurality of arranged nozzles.

13. The image processing apparatus according to claim 3, wherein
the first filter is a low-pass filter.

14. A control method of an image processing apparatus converting input image data into halftone image data that a plurality of arranged nozzles ejecting ink can print, the control method comprising the steps of:
correcting a pixel value of each pixel in the input image data in accordance with a characteristic of the nozzle; and
generating first halftone image data by performing halftone processing for a second frequency component whose frequency is lower than that of a first frequency component of frequency components corresponding to the corrected input image data,
wherein the first halftone image data is data that is generated to be printed with first dots whose dot size causes adjacent dots to overlap.

15. A non-transitory computer readable storage medium storing a program for causing a computer to perform a control method of an image processing apparatus converting input image data into halftone image data that a plurality of arranged nozzles ejecting ink can print, the control method comprising the steps of:
correcting a pixel value of each pixel in the input image data in accordance with a characteristic of the nozzle; and
generating first halftone image data by performing halftone processing for a second frequency component whose frequency is lower than that of a first frequency component of frequency components corresponding to the corrected input image data,
wherein the first halftone image data is data that is generated to be printed with first dots whose dot size causes adjacent dots to overlap.

* * * * *